US012744141B2

(12) United States Patent
Matsuura

(10) Patent No.: US 12,744,141 B2
(45) Date of Patent: Sep. 22, 2026

(54) COIL COMPONENT

(71) Applicant: Murata Manufacturing Co., Ltd., Kyoto-fu (JP)

(72) Inventor: Kouhei Matsuura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 573 days.

(21) Appl. No.: 18/352,869

(22) Filed: Jul. 14, 2023

(65) Prior Publication Data

US 2024/0038425 A1 Feb. 1, 2024

(30) Foreign Application Priority Data

Jul. 29, 2022 (JP) ................................ 2022-121694

(51) Int. Cl.
*H01F 1/34* (2006.01)
*H01F 27/28* (2006.01)
*H01F 27/32* (2006.01)

(52) U.S. Cl.
CPC ......... *H01F 1/344* (2013.01); *H01F 27/2804* (2013.01); *H01F 27/323* (2013.01)

(58) Field of Classification Search
CPC ...... H01F 17/04; H01F 17/0013; H01F 27/24; H01F 2017/0093
See application file for complete search history.

(56) References Cited

U.S. PATENT DOCUMENTS

2014/0191838 A1* 7/2014 Yoshida .............. H01F 27/2804 336/200
2014/0266543 A1* 9/2014 Park ...................... H01F 41/046 336/200
2017/0133144 A1* 5/2017 Lee ........................... H01F 1/37

FOREIGN PATENT DOCUMENTS

JP 2019-102507 A 6/2019

* cited by examiner

*Primary Examiner* — Alexandre F Ferre
(74) *Attorney, Agent, or Firm* — Studebaker Brackett PLLC

(57) ABSTRACT

A coil component includes a bare body including, in a lamination direction, a first glass layer, a first ferrite layer adjacent to one principal surface side of the first glass layer, and a second ferrite layer adjacent to the other principal surface side of the first glass layer, a coil inside the first glass layer, and outer electrodes on surfaces of the bare body and electrically connected to the coil. Assuming that a region between first and second positions is a first inner region, a region between third and fourth positions is a first outer region, and a region between the second and fourth positions is a first intermediate region, an area rate of pores in the first inner region is greater than in the first intermediate region, and an average crystal particle size of ferrite in the first inner region is smaller than in the first intermediate region.

16 Claims, 4 Drawing Sheets

COIL COMPONENT

CROSS-REFERENCE TO RELATED APPLICATION

This application claims benefit of priority to Japanese Patent Application No. 2022-121694, filed Jul. 29, 2022, the entire content of which is incorporated herein by reference.

BACKGROUND

Technical Field

The present disclosure relates to a coil component.

Background Art

Japanese Unexamined Patent Application Publication No. 2019-102507 discloses a multilayer coil component including a pair of magnetic material layers formed on both principal surfaces of a first dielectric glass layer in which an inner conductor is embedded, and a pair of second dielectric glass layers formed on respective one principal surfaces of the pair of magnetic material layers. At least one of the pair of second dielectric glass layers has a thickness of 10 to 64 μm.

As a result of studies, however, the inventor has found the following point. In the multilayer coil component disclosed in Japanese Unexamined Patent Application Publication No. 2019-102507, there is a possibility that adhesion between the dielectric glass layer (also called a glass layer) and the magnetic material layer (also called a ferrite layer) becomes insufficient in some cases.

SUMMARY

Accordingly, the present disclosure provides a coil component with high adhesion between the glass layer and the ferrite layer.

The present disclosure provides a coil component including a bare body including, in a lamination direction, a first glass layer, a first ferrite layer adjacent to one principal surface side of the first glass layer, and a second ferrite layer adjacent to the other principal surface side of the first glass layer; a coil disposed inside the first glass layer; and outer electrodes disposed on surfaces of the bare body and electrically connected to the coil.

Assuming that, in the first ferrite layer, a position of a principal surface on a side nearer to the first glass layer is denoted by a first position, a position 10 μm away from the first position in the lamination direction is denoted by a second position, a position of a principal surface on a side opposite to the first glass layer is denoted by a third position, a position 10 μm away from the third position in the lamination direction is denoted by a fourth position, a region between the first position and the second position is denoted by a first inner region, a region between the third position and the fourth position is denoted by a first outer region, and a region between the second position and the fourth position is denoted by a first intermediate region. Also, an area rate of pores in the first inner region is greater than an area rate of pores in the first intermediate region, and an average crystal particle size of ferrite in the first inner region is smaller than an average crystal particle size of ferrite in the first intermediate region.

According to the present disclosure, the coil component with high adhesion between the glass layer and the ferrite layer can be obtained.

DETAILED DESCRIPTION

Figure 1:
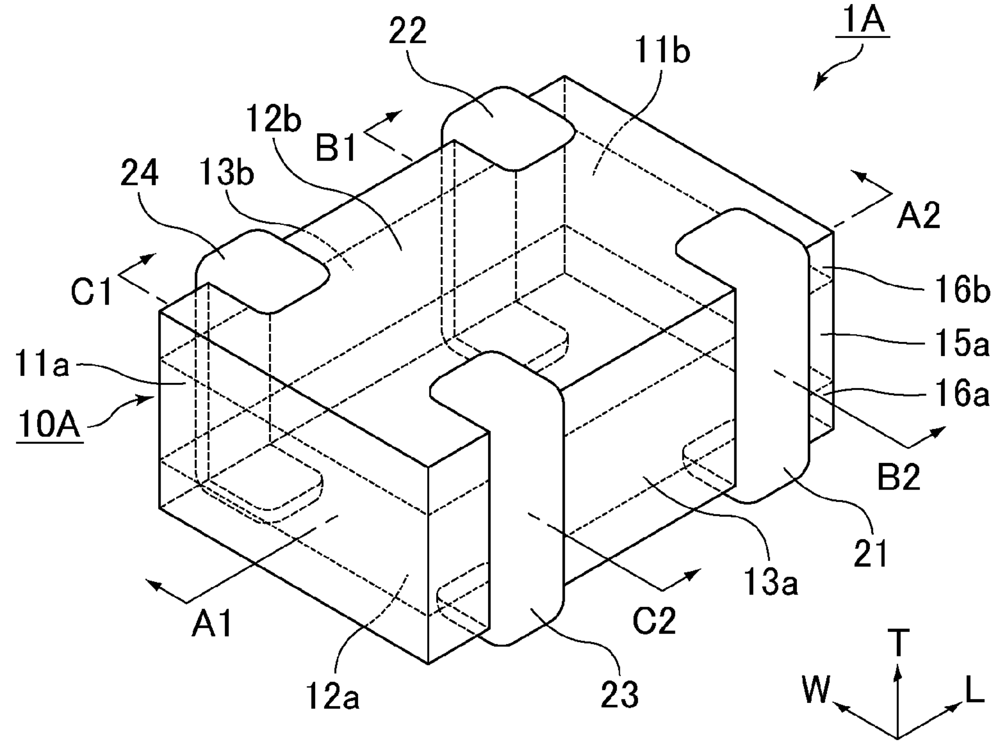
FIG. 1 is a schematic perspective view illustrating an example of a coil component according to a first embodiment of the present disclosure.

A coil component according to the present disclosure will be described below. The present disclosure is not limited to configurations described below and may be modified as appropriate insofar as not departing from the gist of the present disclosure. Configurations resulting from combining two or more among individual preferred configurations described below also fall within the scope of the present disclosure.

It is needless to say that the following embodiments are merely illustrative and that the configurations described in different embodiments may be partially replaced or combined with each other. In a second and subsequent embodiments, description of common matters to those in a first embodiment is omitted, and a different point is mainly described. Particularly, similar operations and advantageous effects with similar configurations are not mentioned repeatedly for each of the different embodiments.

In the following description, the wording "the coil component of the present disclosure" is used when there is no necessity of distinguishing coil components according to the different embodiments from each other.

In the following embodiments, a common mode choke coil is described as an example of the coil component of the present disclosure. The coil component of the present disclosure can be further applied to a coil component other than the common mode choke coil.

Drawings referenced in the following description are schematic views, and dimensions, aspect-ratio scales, and so on illustrated in the drawings are different from those of actual products in some cases.

In this Specification, the terms (such as "parallel" and "orthogonal") indicating relationships between elements and the terms indicating shapes of elements represent not only the strict literal meaning of each term, but also the meaning covering a substantially identical range, for example, a range including a difference of about several percentages.

The coil component according to the present disclosure includes a bare body including, in a lamination direction, a first glass layer, a first ferrite layer adjacent to one principal surface side of the first glass layer, and a second ferrite layer adjacent to the other principal surface side of the first glass layer; a coil disposed inside the first glass layer; and outer electrodes disposed on surfaces of the bare body and electrically connected to the coil. Assuming that, in the first ferrite layer, a position of a principal surface on a side nearer to the first glass layer is denoted by a first position, a position 10 μm away from the first position in the lamination direction is denoted by a second position, a position of a principal surface on a side opposite to the first glass layer is denoted by a third position, a position 10 μm away from the third position in the lamination direction is denoted by a fourth position, a region between the first position and the second position is denoted by a first inner region, a region between the third position and the fourth position is denoted by a first outer region, and a region between the second position and the fourth position is denoted by a first intermediate region. Also, an area rate of pores in the first inner region is greater than an area rate of pores in the first intermediate region, and an average crystal particle size of ferrite in the first inner region is smaller than an average crystal particle size of ferrite in the first intermediate region.

First Embodiment

In the coil component according to the first embodiment of the present disclosure, a bare body includes, in a lamination direction, a first glass layer, a first ferrite layer adjacent to one principal surface side of the first glass layer, and a second ferrite layer adjacent to the other principal surface side of the first glass layer.

FIG. 1 is a schematic perspective view illustrating an example of a coil component according to the first embodiment of the present disclosure.

A coil component 1A illustrated in FIG. 1 includes a bare body 10A, a first outer electrode 21, a second outer electrode 22, a third outer electrode 23, and a fourth outer electrode 24. Although not illustrated in FIG. 1, as described later, the coil component 1A further includes a first coil and a second coil both disposed inside the bare body 10A.

The coil component 1A is also called a common mode choke coil that is one type of circuit noise filter.

In this Specification, a length direction, a height direction, and a width direction are defined as directions denoted by L, T, and W, respectively, as illustrated in FIG. 1 and so on. The length direction L, the height direction T, and the width direction W are orthogonal to one another.

The bare body 10A has a first end surface 11*a* and a second end surface 11*b* opposite to each other in the length direction L, a first principal surface 12*a* and a second principal surface 12*b* opposite to each other in the height direction T, and a first side surface 13*a* and a second side surface 13*b* opposite to each other in the width direction W. Thus, the bare body 10A has, for example, a rectangular parallelepiped shape or a substantially rectangular parallelepiped shape.

The first end surface 11*a* and the second end surface 11*b* of the bare body 10A are not required to be strictly orthogonal to the length direction L. The first principal surface 12*a* and the second principal surface 12*b* of the bare body 10A are not required to be strictly orthogonal to the height direction T. The first side surface 13*a* and the second side surface 13*b* of the bare body 10A are not required to be strictly orthogonal to the width direction W.

When the coil component 1A is mounted to a substrate, the first principal surface 12*a* of the bare body 10A serves as a mounting surface.

Corner portions and ridge portions of the bare body 10A are preferably rounded. The corner portions of the bare body 10A are each a portion where three surfaces of the bare body 10A intersect. The ridge portions of the bare body 10A are each a portion where two surfaces of the bare body 10A intersect.

The bare body 10A includes, in the lamination direction, a first glass layer 15*a*, a first ferrite layer 16*a*, and a second ferrite layer 16*b*. In the bare body 10A, the lamination direction of the first glass layer 15*a* and so on is parallel to the height direction T. Stated another way, in the bare body 10A, the lamination direction of the first glass layer 15*a* and so on is orthogonal to the first principal surface 12*a*, serving as the mounting surface, of the bare body 10A.

In the lamination direction (here, the height direction T), the first ferrite layer 16*a* is adjacent to one principal surface side of the first glass layer 15*a*, and the second ferrite layer 16*b* is adjacent to the other principal surface side of the first glass layer 15*a*. Stated another way, in the bare body 10A, the first glass layer 15*a* is sandwiched between the first ferrite layer 16*a* and the second ferrite layer 16*b* in the lamination direction (here, the height direction T).

While, in this specification, the lamination direction (here, the height direction) is set to a vertical direction, the first principal surface of the bare body is illustrated as being positioned on a lower side, and the second principal surface of the bare body is illustrated as being positioned on an upper side, the lamination direction and so on are not limited to the illustrated ones, and orientations and locations of individual parts can be changed as appropriate depending on an installation state of the coil component. For example, the bare body 10A may be oriented such that the first ferrite layer 16*a* is positioned on the lower side in the vertical direction and the second ferrite layer 16*b* is positioned on the upper side in the vertical direction, or that the first ferrite layer 16*a* is positioned on the upper side in the vertical direction and the second ferrite layer 16*b* is positioned on the lower side in the vertical direction.

Although not illustrated in FIG. 1, as described later, the first coil and the second coil are disposed inside the first glass layer 15*a*.

The first glass layer 15*a* has, for example, a multilayer structure in which multiple insulating layers are laminated in the lamination direction (here, the height direction T) as described later.

The first glass layer 15*a* is made of a glass ceramic material (also called a dielectric glass material).

The first glass layer 15*a* preferably includes a glass material containing K, B, and Si. In other words, the glass ceramic material constituting the first glass layer 15*a* preferably includes the glass material containing K, B, and Si.

The glass material included in the first glass layer 15*a* preferably contains, assuming a total amount to be 100 weight %, 0.5 weight % or more and 5 weight % or less (i.e., from 0.5 weight % to 5 weight %) of K in terms of $K_2O$, 10 weight % or more and 25 weight % or less (i.e., from 10 weight % to 25 weight %) of B in terms of $B_2O_3$, 70 weight % or more and 85 weight % or less (i.e., from 70 weight % to 85 weight %) of Si in terms of $SiO_2$, and 0 weight % or more and 5 weight % or less (i.e., from 0 weight % to 5 weight %) of Al in terms of $Al_2O_3$.

The first glass layer 15*a* preferably includes a filler containing at least one of quartz ($SiO_2$) and alumina ($Al_2O_3$). In other words, the glass ceramic material constituting the first glass layer 15$a$ preferably includes the filler containing at least one of the quartz and the alumina. With the glass ceramic material of the first glass layer 15$a$ containing the quartz as the filler, high frequency characteristics of the coil component 1A are made easier to improve. Furthermore, with the glass ceramic material of the first glass layer 15$a$ containing the alumina as the filler, mechanical strength of the bare body 10A is made easier to increase.

When the glass ceramic material constituting the first glass layer 15$a$ contains the quartz and the alumina as the filler, the glass ceramic material preferably contains, assuming a total amount to be 100 weight %, 60 weight % or more and 66 weight % or less (i.e., from 60 weight % to 66 weight %) of the glass material, 34 weight % or more and 37 weight % or less (i.e., from 34 weight % to 37 weight %) of the quartz as the filler, and 0.5 weight % or more and 4 weight % or less (i.e., from 0.5 weight % to 4 weight %) of the alumina as the filler.

The first ferrite layer 16$a$ and the second ferrite layer 16$b$ each have, for example, a multilayer structure in which multiple insulating layers are laminated in the lamination direction (here, the height direction T) as described later.

The first ferrite layer 16$a$ and the second ferrite layer 16$b$ are each preferably made of a Ni—Cu—Zn ferrite material. In this case, an inductance of the coil component 1A is made easier to increase.

The Ni—Cu—Zn ferrite material constituting each of the first ferrite layer 16$a$ and the second ferrite layer 16$b$ preferably contains, assuming a total amount to be 100 mol %, 40 mol % or more and 49.5 mol % or less (i.e., from 40 mol % to 49.5 mol %) of Fe in terms of $Fe_2O_3$, 5 mol % or more and 35 mol % or less (i.e., from 5 mol % to 35 mol %) of Zn in terms of ZnO, 6 mol % or more and 12 mol % or less (i.e., from 6 mol % to 12 mol %) of Cu in terms of CuO, and 8 mol % or more and 40 mol % or less (i.e., from 8 mol % to 40 mol %) of Ni in terms of NiO.

The Ni—Cu—Zn ferrite material constituting each of the first ferrite layer 16$a$ and the second ferrite layer 16$b$ may further contain additives such as $Mn_3O_4$, $Co_3O_4$, $SnO_2$, $Bi_2O_3$, and $SiO_2$.

The Ni—Cu—Zn ferrite material constituting each of the first ferrite layer 16$a$ and the second ferrite layer 16$b$ may further contain unavoidable impurities.

Respective sizes of the first glass layer 15$a$, the first ferrite layer 16$a$, and the second ferrite layer 16$b$ in the height direction T may be the same, different from one another, or different in part. When the sizes of the first glass layer 15$a$, the first ferrite layer 16$a$, and the second ferrite layer 16$b$ in the height direction T are different from one another or different in part, a relationship in size value among those layers is not limited to a particular one.

The glass layer and the ferrite layer are discriminated as follows. First, after sealing the periphery of the coil component with resin as required, the coil component is polished in a first direction (for example, the width direction) orthogonal to the lamination direction (for example, the height direction), thereby exposing a cross-section substantially in a central portion in the first direction, the cross-section extending along a second direction (for example, the length direction) orthogonal to both the lamination direction and the first direction and along the lamination direction. Then, for a region where different layers are estimated to exist in the exposed cross-section of the bare body (for example, a region where different layers are estimated to exist due to a difference in color tone or the like), a composition (content ratios of elements detected) is measured by a scanning transmission electron microscope-energy dispersive X-ray (STEM-EDX) analysis. Then, the glass layer and the ferrite layer are discriminated from the measured composition by determining whether the material constituting each layer is the glass ceramic material or the ferrite material.

The first outer electrode 21 is disposed on the surfaces of the bare body 10A. In the example illustrated in FIG. 1, the first outer electrode 21 extends from a portion of the first side surface 13$a$ of the bare body 10A to a portion of each of the first principal surface 12$a$ and the second principal surface 12$b$.

The second outer electrode 22 is disposed on the surfaces of the bare body 10A. In the example illustrated in FIG. 1, the second outer electrode 22 extends from a portion of the second side surface 13$b$ of the bare body 10A to a portion of each of the first principal surface 12$a$ and the second principal surface 12$b$. Moreover, the second outer electrode 22 is disposed at a position opposite to the first outer electrode 21 in the width direction W.

The third outer electrode 23 is disposed on the surfaces of the bare body 10A. In the example illustrated in FIG. 1, the third outer electrode 23 extends from a portion of the first side surface 13$a$ of the bare body 10A to a portion of each of the first principal surface 12$a$ and the second principal surface 12$b$ at a position away from the first outer electrode 21 in the length direction L.

The fourth outer electrode 24 is disposed on the surfaces of the bare body 10A. In the example illustrated in FIG. 1, the fourth outer electrode 24 extends from a portion of the second side surface 13$b$ of the bare body 10A to a portion of each of the first principal surface 12$a$ and the second principal surface 12$b$ at a position away from the second outer electrode 22 in the length direction L. Moreover, the fourth outer electrode 24 is disposed at a position opposite to the third outer electrode 23 in the width direction W.

As described above, the first outer electrode 21, the second outer electrode 22, the third outer electrode 23, and the fourth outer electrode 24 are disposed on the surfaces of the bare body 10A at the positions away from one another.

When the respective portions of the first outer electrode 21, the second outer electrode 22, the third outer electrode 23, and the fourth outer electrode 24 are disposed on the first principal surface 12$a$, serving as the mounting surface, of the bare body 10A as described above, convenience in mounting of the coil component 1A is made easier to improve.

Layouts of the first outer electrode 21, the second outer electrode 22, the third outer electrode 23, and the fourth outer electrode 24 are not limited to the ones illustrated in FIG. 1.

The first outer electrode 21, the second outer electrode 22, the third outer electrode 23, and the fourth outer electrode 24 each may have a single-layer structure or a multilayer structure.

When the first outer electrode 21, the second outer electrode 22, the third outer electrode 23, and the fourth outer electrode 24 each have the single-layer structure, a material constituting each of the outer electrodes may be, for example, Ag, Au, Cu, Pd, Ni, Al, or an alloy containing at least one of the above-mentioned metals.

When the first outer electrode 21, the second outer electrode 22, the third outer electrode 23, and the fourth outer electrode 24 each have the multilayer structure, each outer electrode may include, for example, an underlying electrode containing Ag, a Ni-plated electrode, and a Sn-plated electrode in order from a surface side of the bare body 10A.

Figure 2:
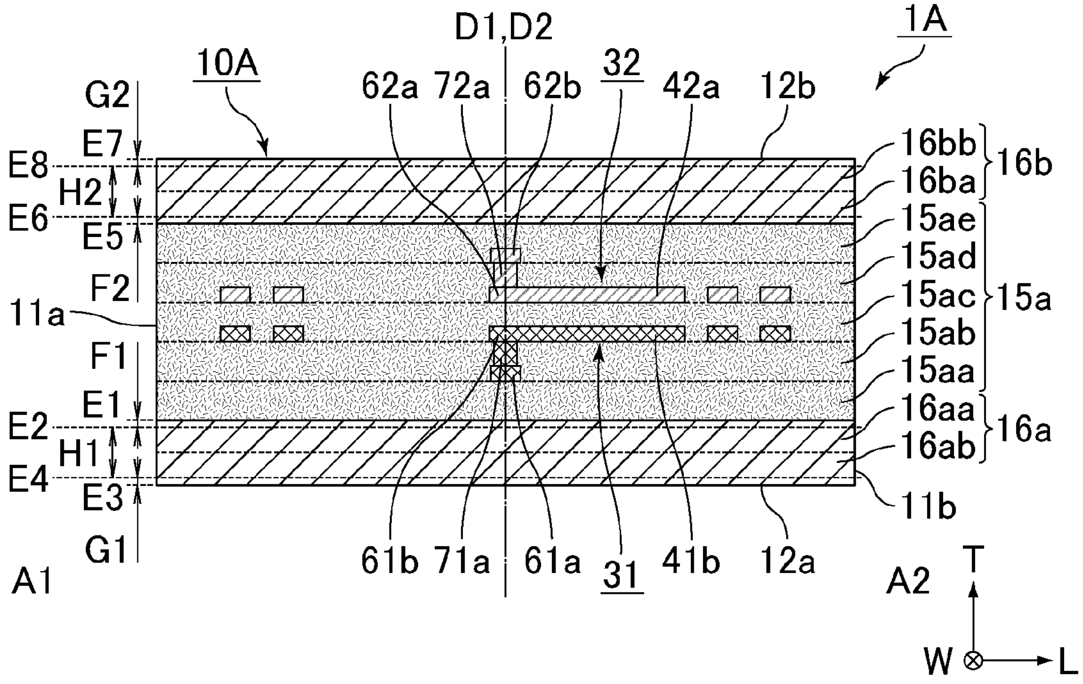
FIG. 2 is a schematic sectional view illustrating an example of a cross-section, taken along a line segment A1-A2, of the coil component illustrated in FIG. 1.
Figure 3:
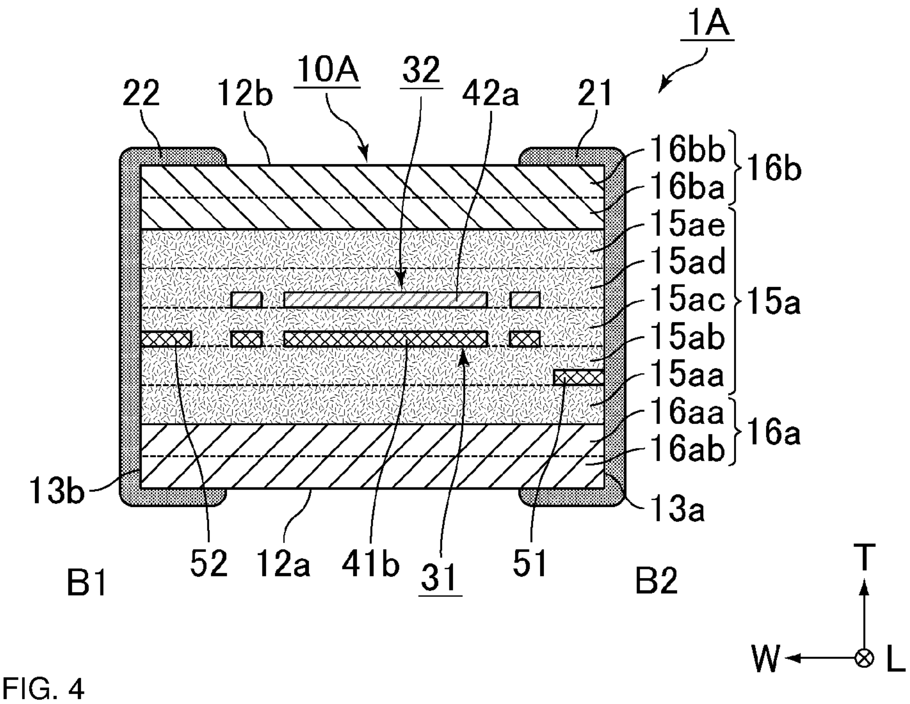
FIG. 3 is a schematic sectional view illustrating an example of a cross-section, taken along a line segment B1-B2, of the coil component illustrated in FIG. 1.
Figure 4:
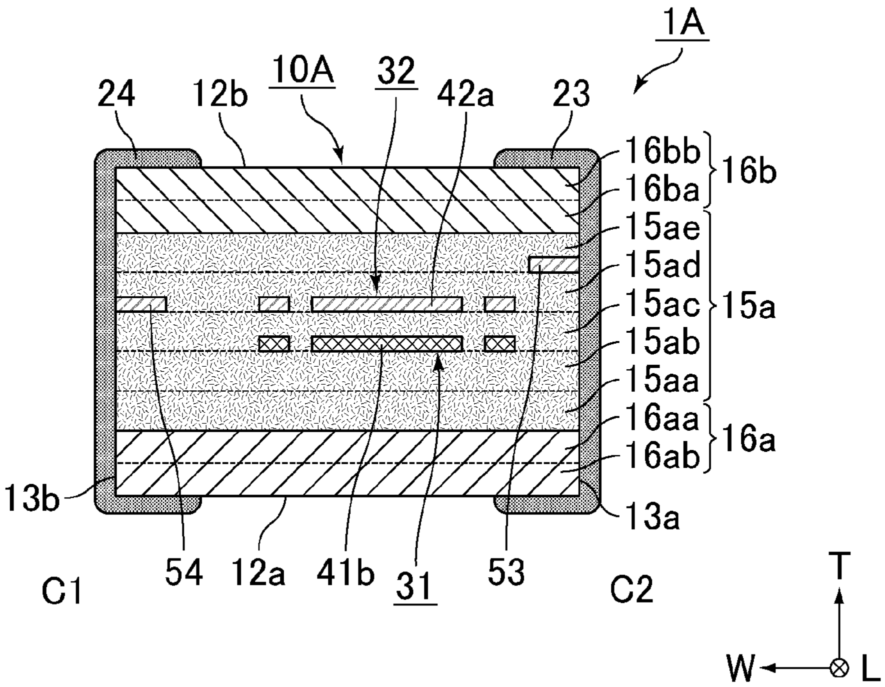
FIG. 4 is a schematic sectional view illustrating an example of a cross-section, taken along a line segment C1-C2, of the coil component illustrated in FIG. 1.

FIG. 2 is a schematic sectional view illustrating an example of a cross-section, taken along a line segment A1-A2, of the coil component illustrated in FIG. 1. FIG. 3 is a schematic sectional view illustrating an example of a cross-section, taken along a line segment B1-B2, of the coil component illustrated in FIG. 1. FIG. 4 is a schematic sectional view illustrating an example of a cross-section, taken along a line segment C1-C2, of the coil component illustrated in FIG. 1.

As illustrated in FIGS. 2, 3, and 4, the first glass layer 15*a* is formed by laminating an insulating layer 15*aa*, an insulating layer 15*ab*, an insulating layer 15*ac*, an insulating layer 15*ad*, and an insulating layer 15*ae* successively in the lamination direction (here, the height direction T). More specifically, in the first glass layer 15*a*, the insulating layer 15*aa*, the insulating layer 15*ab*, the insulating layer 15*ac*, the insulating layer 15*ad*, and the insulating layer 15*ae* are successively laminated in a direction from a side nearer to the first principal surface 12*a* toward a side nearer to the second principal surface 12*b* of the bare body 10A.

Materials constituting the insulating layer 15*aa*, the insulating layer 15*ab*, the insulating layer 15*ac*, the insulating layer 15*ad*, and the insulating layer 15*ae* are preferably the same, but those materials may be different from one another or different in part.

While, for convenience of explanation, boundaries between adjacent twos of the insulating layers constituting the first glass layer 15*a* are illustrated in FIGS. 2, 3, and 4, those boundaries do not appear clearly in fact.

As illustrated in FIGS. 2, 3, and 4, the first ferrite layer 16*a* is formed by laminating an insulating layer 16*aa* and an insulating layer 16*ab* in the lamination direction (here, the height direction T). More specifically, in the first ferrite layer 16*a*, the insulating layer 16*aa* and the insulating layer 16*ab* are successively laminated from a side nearer to the first glass layer 15*a*.

While, for convenience of explanation, a boundary between the insulating layers constituting the first ferrite layer 16*a* is illustrated in FIGS. 2, 3, and 4, the boundary does not appear clearly in fact.

As illustrated in FIGS. 2, 3, and 4, the second ferrite layer 16*b* is formed by laminating an insulating layer 16*ba* and an insulating layer 16*bb* in the lamination direction (here, the height direction T). More specifically, in the second ferrite layer 16*b*, the insulating layer 16*ba* and the insulating layer 16*bb* are successively laminated from a side nearer to the first glass layer 15*a*.

While, for convenience of explanation, a boundary between the insulating layers constituting the second ferrite layer 16*b* is illustrated in FIGS. 2, 3, and 4, the boundary does not appear clearly in fact.

The first coil 31 and the second coil 32 are disposed inside the first glass layer 15*a*.

The first coil 31 and the second coil 32 are insulated from each other.

The first coil 31, more specifically, one end of the first coil 31, is electrically connected to the first outer electrode 21 through a first lead-out conductor 51 illustrated in FIG. 3. In the example illustrated in FIG. 3, the first lead-out conductor 51 is exposed to the first side surface 13*a* of the bare body 10A, and the first outer electrode 21 is connected to an exposed portion of the first lead-out conductor 51.

The first coil 31, more specifically, the other end of the first coil 31, is electrically connected to the second outer electrode 22 through a second lead-out conductor 52 illustrated in FIG. 3. In the example illustrated in FIG. 3, the second lead-out conductor 52 is exposed to the second side surface 13*b* of the bare body 10A, and the second outer electrode 22 is connected to an exposed portion of the second lead-out conductor 52.

The second coil 32, more specifically, one end of the second coil 32, is electrically connected to the third outer electrode 23 through a third lead-out conductor 53 illustrated in FIG. 4. In the example illustrated in FIG. 4, the third lead-out conductor 53 is exposed to the first side surface 13*a* of the bare body 10A, and the third outer electrode 23 is connected to an exposed portion of the third lead-out conductor 53.

The second coil 32, more specifically, the other end of the second coil 32, is electrically connected to the fourth outer electrode 24 through a fourth lead-out conductor 54 illustrated in FIG. 4. In the example illustrated in FIG. 4, the fourth lead-out conductor 54 is exposed to the second side surface 13*b* of the bare body 10A, and the fourth outer electrode 24 is connected to an exposed portion of the fourth lead-out conductor 54.

As described above, the coil component 1A is the common mode choke coil including, as coils, the first coil 31 and the second coil 32 insulated from the first coil 31.

As illustrated in FIG. 2, the first coil 31 has a coil axis D1. In the example illustrated in FIG. 2, the coil axis D1 of the first coil 31 penetrates through the bare body 10A between the first principal surface 12*a* and the second principal surface 12*b* thereof along the height direction T. Stated another way, a direction of the coil axis D1 of the first coil 31 is orthogonal to the first principal surface 12*a* of the bare body 10A, serving as the mounting surface, of the bare body 10A.

As illustrated in FIG. 2, the second coil 32 has a coil axis D2. In the example illustrated in FIG. 2, the coil axis D2 of the second coil 32 penetrates through the bare body between the first principal surface 12*a* and the second principal surface 12*b* thereof along the height direction T. Stated another way, a direction of the coil axis D2 of the second coil 32 is orthogonal to the first principal surface 12*a*, serving as the mounting surface, of the bare body 10A.

The coil axis D1 of the first coil 31 and the coil axis D2 of the second coil 32 pass respectively an inner peripheral side of the first coil 31 and an inner peripheral side of the second coil 32 when viewed from the height direction T, but those axes are illustrated in FIG. 2 for convenience of explanation.

As described above, the lamination direction of the insulating layers constituting the first glass layer 15*a*, the direction of the coil axis D1 of the first coil 31, and the direction of the coil axis D2 of the second coil 32 extend along the same direction, namely the height direction T, and are orthogonal to the first principal surface 12*a*, serving as the mounting surface, of the bare body 10A.

Figure 5:
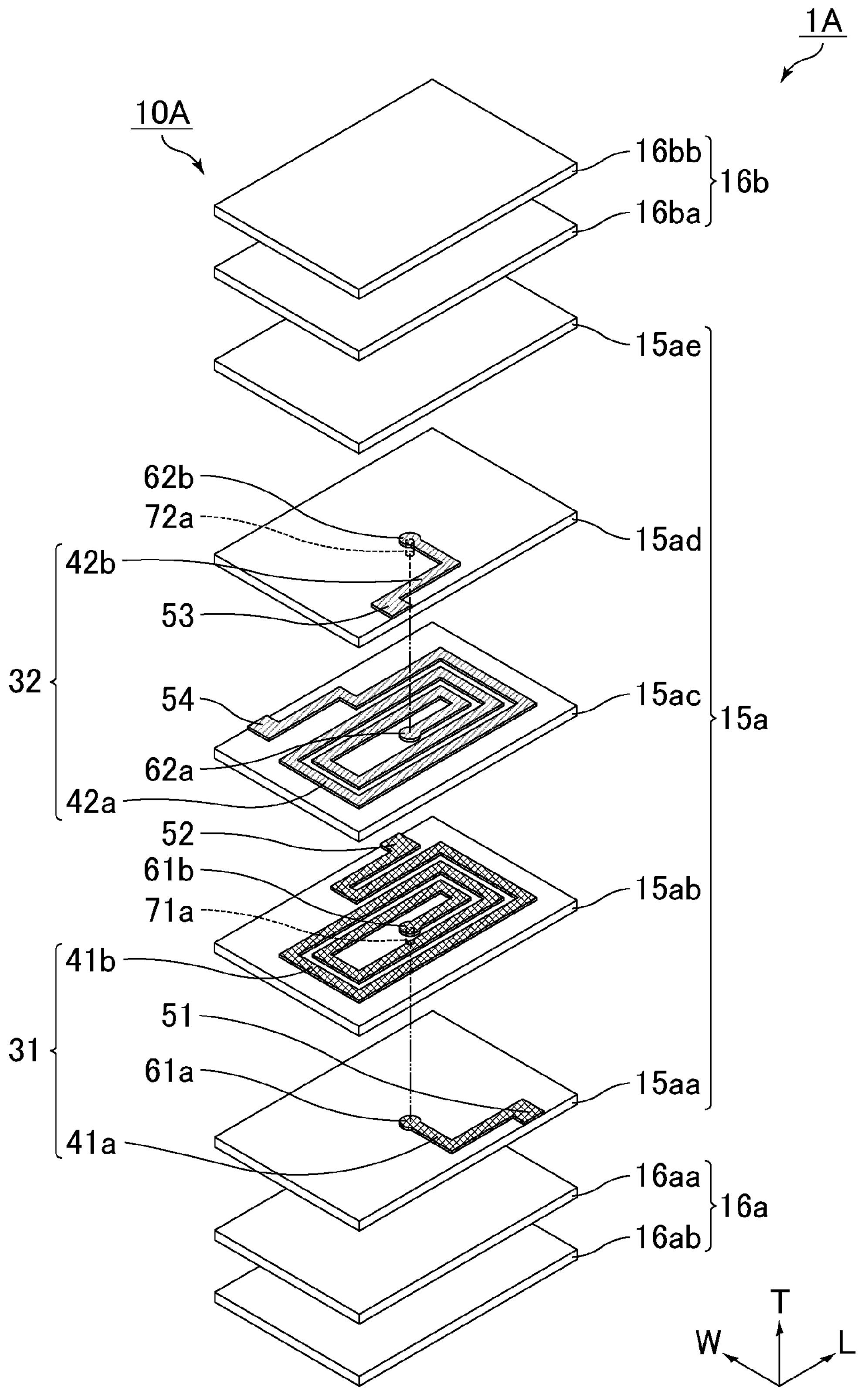
FIG. 5 is a schematic perspective view illustrating, by way of example, an exploded state of the coil component (except for outer electrodes) illustrated in FIG. 1.

FIG. 5 is a schematic perspective view illustrating, by way of example, an exploded state of the coil component (except for the outer electrodes) illustrated in FIG. 1.

As illustrated in FIG. 5, the first coil 31 includes a coil conductor 41*a* and a coil conductor 41*b*.

The coil conductor 41*a* is disposed on a principal surface of the insulating layer 15*aa*. The coil conductor 41*a* includes a land portion 61*a* at one end and is connected at the other end to the first lead-out conductor 51.

The coil conductor 41*b* is disposed on a principal surface of the insulating layer 15*ab*. The coil conductor 41*b* includes a land portion 61*b* at one end and is connected at the other end to the second lead-out conductor 52.

The land portion 61*a* of the coil conductor 41*a* and the land portion 61*b* of the coil conductor 41*b* overlap with each other when viewed from the height direction T.

A via conductor 71*a* is disposed in the insulating layer 15*ab* to penetrate therethrough in the height direction T at a position where the land portion 61*a* and the land portion 61*b* overlap with each other when viewed from the height direction T.

In the coil component 1A, the insulating layer 15*aa* and the insulating layer 15*ab* are laminated in the lamination direction (here, the height direction T), whereby the coil conductor 41*a* and the coil conductor 41*b* are laminated in the height direction T together with the above-mentioned insulating layers while those coil conductors are electrically connected to each other. More specifically, the land portion 61*a* of the coil conductor 41*a* and the land portion 61*b* of the coil conductor 41*b* are electrically connected to each other through the via conductor 71*a*. Thus, the first coil 31 is constituted as a result of the coil conductor 41*a* and the coil conductor 41*b* being electrically connected to each other.

As illustrated in FIG. 5, the second coil 32 includes a coil conductor 42*a* and a coil conductor 42*b*.

The coil conductor 42*a* is disposed on a principal surface of the insulating layer 15*ac*. The coil conductor 42*a* includes a land portion 62*a* at one end and is connected at the other end to the fourth lead-out conductor 54.

The coil conductor 42*b* is disposed on a principal surface of the insulating layer 15*ad*. The coil conductor 42*b* includes a land portion 62*b* at one end and is connected at the other end to the third lead-out conductor 53.

The land portion 62*a* of the coil conductor 42*a* and the land portion 62*b* of the coil conductor 42*b* overlap with each other when viewed from the height direction T.

A via conductor 72*a* is disposed in the insulating layer 15*ad* to penetrate therethrough in the height direction T at a position where the land portion 62*a* and the land portion 62*b* overlap with each other when viewed from the height direction T.

In the coil component 1A, the insulating layer 15*ac* and the insulating layer 15*ad* are laminated in the lamination direction (here, the height direction T), whereby the coil conductor 42*a* and the coil conductor 42*b* are laminated in the height direction T together with the above-mentioned insulating layers while those coil conductors are electrically connected to each other. More specifically, the land portion 62*a* of the coil conductor 42*a* and the land portion 62*b* of the coil conductor 42*b* are electrically connected to each other through the via conductor 72*a*. Thus, the second coil 32 is constituted as a result of the coil conductor 42*a* and the coil conductor 42*b* being electrically connected to each other.

In the first glass layer 15*a*, in continuity with a laminated portion of the insulating layer 15*aa*, the insulating layer 15*ab*, the insulating layer 15*ac*, and the insulating layer 15*ad*, the insulating layer 15*ae* not including any conductors disposed thereon, such as a coil conductor, a lead-out conductor, and a via conductor, is further laminated on a side nearer to the second principal surface 12*b* of the bare body 10A. This provides a configuration that the first coil 31 and the second coil 32 (especially, the second coil 32) are disposed inside the first glass layer 15*a*.

In the first glass layer 15*a*, in continuity with a laminated portion of the insulating layer 15*aa*, the insulating layer 15*ab*, the insulating layer 15*ac*, the insulating layer 15*ad*, and the insulating layer 15*ae*, at least one insulating layer not including any conductors disposed thereon, such as a coil conductor, a lead-out conductor, and a via conductor, may be further laminated on a side nearer to at least one of the first principal surface 12*a* and the second principal surface 12*b* of the bare body 10A. Stated another way, the number of the insulating layers constituting the first glass layer 15*a* is not limited to the number (five) illustrated in the example of FIG. 5.

The number of coil conductors constituting each of the first coil 31 and the second coil 32 is not limited to the number (two) illustrated in the example of FIG. 5.

When viewed from the lamination direction (here, the height direction T), the coil conductors each may have a shape formed only by linear portions as illustrated in FIG. 5, a shape formed only by curved portions, or a shape formed by linear and curved portions. In other words, when viewed from the height direction T, the first coil 31 and the second coil 32 each may have the shape formed only by the linear portions as illustrated in FIG. 5, a shape formed only by curved portions, or a shape formed by linear and curved portions.

When viewed from the lamination direction (here, the height direction T), the land portions each may have a circular shape as illustrated in FIG. 5 or a polygonal shape.

The coil conductors are each not always required to include the independent land portion in one end portion thereof.

A material constituting each of the coil conductors, each of the lead-out conductors, and each of the via conductors may be, for example, Ag, Au, Cu, Pd, Ni, Al, or an alloy containing at least one of the above-mentioned metals.

As described above, the first ferrite layer 16*a* is formed by laminating the insulating layer 16*aa* and the insulating layer 16*ab* in the lamination direction (here, the height direction T).

The number of insulating layers constituting the first ferrite layer 16*a* is not limited to the number (two) illustrated in the example of FIG. 5. In other words, the number of insulating layers constituting the first ferrite layer 16*a* may be only one or two or more.

As described above, the second ferrite layer 16*b* is formed by laminating the insulating layer 16*ba* and the insulating layer 16*bb* in the lamination direction (here, the height direction T).

The number of insulating layers constituting the second ferrite layer 16*b* is not limited to the number (two) illustrated in the example of FIG. 5. In other words, the number of insulating layers constituting the second ferrite layer 16*b* may be only one or two or more.

Assuming, as illustrated in FIG. 2, that, in the first ferrite layer 16*a*, a position of a principal surface on a side nearer to the first glass layer 15*a* is denoted by a first position E1, a position 10 μm away from the first position E1 in the lamination direction (here, the height direction T) is denoted by a second position E2, a position of a principal surface on a side opposite to the first glass layer 15*a* is denoted by a third position E3, a position 10 μm away from the third position E3 in the lamination direction (here, the height direction T) is denoted by a fourth position E4, a region between the first position E1 and the second position E2 is denoted by a first inner region F1, a region between the third position E3 and the fourth position E4 is denoted by a first outer region G1, and a region between the second position E2 and the fourth position E4 is denoted by a first intermediate region H1, the coil component 1A satisfies both features (1) and (2) given below:

(1) An area rate of pores (small holes) in the first inner region F1 is greater than that in the first intermediate region H1.

(2) An average crystal particle size of ferrite in the first inner region F1 is smaller than that in the first intermediate region H1.

In the coil component 1A, since the above-described features (1) and (2) are both satisfied, adhesion (for example, bonding strength) between the first glass layer 15*a* and the first ferrite layer 16*a* is increased.

Assuming the area rate of the pores in the first inner region F1 to be 1, the area rate of the pores in the first intermediate region H1 is preferably 0.3 or more and 0.8 or less (i.e., from 0.3 to 0.8). In this case, the adhesion between the first glass layer 15*a* and the first ferrite layer 16*a* is greatly increased.

Assuming the average crystal particle size of the ferrite in the first inner region F1 to be 1, the average crystal particle size of the ferrite in the first intermediate region H1 is preferably 1.5 or more and 2.5 or less (i.e., from 1.5 to 2.5). In this case, the adhesion between the first glass layer 15*a* and the first ferrite layer 16*a* is greatly increased.

The area rate of the pores in a target region of the ferrite layer is determined as follows. First, after sealing the periphery of the coil component with resin as required, the coil component is polished in a first direction (for example, the width direction) orthogonal to the lamination direction (for example, the height direction), thereby exposing a cross-section substantially in a central portion in the first direction, the cross-section extending along the second direction (for example, the length direction) orthogonal to both the lamination direction and the first direction and along the lamination direction. At that time, the cross-section extending along the length direction and the height direction as illustrated in FIG. 2, for example, may be exposed, or a cross-section extending along the width direction and the height direction may be exposed. Then, an image of the exposed cross-section is taken by a scanning electron microscope (SEM) with a magnification of 5000 and a visual field size of 8 μm square. Then, an image analysis is performed on the taken cross-section image of 8 μm square with image analysis software, and the area rate of the pores in the target region of the ferrite layer is measured. The above-described measurement of the area rate of the pores is performed on each of cross-section images taken at five positions, and an average value of obtained five measured values is determined as the area rate of the pores in the target region of the ferrite layer.

The average crystal particle size of the ferrite in the target region of the ferrite layer is determined as follows. First, by performing an image analysis with the image analysis software on the cross-section image of 8 μm square used in measuring the area rate of the pores, an area occupied by one ferrite crystal particle in the target region of the ferrite layer is determined, and an equivalent circle diameter is determined from that area. Then, the above-described measurement of the equivalent circle diameter is performed on twenty ferrite crystal particles in the same cross-section image, and an average value of obtained twenty measured values is determined as the average crystal particle size of the ferrite in the target region of the ferrite layer.

Assuming, as illustrated in FIG. 2, that, in the second ferrite layer 16*b*, a position of a principal surface on a side nearer to the first glass layer 15*a* is denoted by a fifth position E5, a position 10 μm away from the fifth position E5 in the lamination direction (here, the height direction T) is denoted by a sixth position E6, a position of a principal surface on a side opposite to the first glass layer 15*a* is denoted by a seventh position E7, a position 10 μm away from the seventh position E7 in the lamination direction (here, the height direction T) is denoted by an eighth position E8, a region between the fifth position E5 and the sixth position E6 is denoted by a second inner region F2, a region between the seventh position E7 and the eighth position E8 is denoted by a second outer region G2, and a region between the sixth position E6 and the eighth position E8 is denoted by a second intermediate region H2, the coil component 1A preferably satisfies both features (3) and (4) given below:

(3) An area rate of pores in the second inner region F2 is greater than that in the second intermediate region H2.

(4) An average crystal particle size of ferrite in the second inner region F2 is smaller than that in the second intermediate region H2.

In the coil component 1A, since the above-described features (3) and (4) are both satisfied, adhesion (for example, bonding strength) between the first glass layer 15*a* and the second ferrite layer 16*b* is increased.

Assuming the area rate of the pores in the second inner region F2 to be 1, the area rate of the pores in the second intermediate region H2 is preferably 0.3 or more and 0.8 or less (i.e., from 0.3 to 0.8). In this case, the adhesion between the first glass layer 15*a* and the second ferrite layer 16*b* is greatly increased.

Assuming the average crystal particle size of the ferrite in the second inner region F2 to be 1, the average crystal particle size of the ferrite in the second intermediate region H2 is preferably 1.5 or more and 2.5 or less (i.e., from 1.5 to 2.5). In this case, the adhesion between the first glass layer 15*a* and the second ferrite layer 16*b* is greatly increased.

The coil component 1A is manufactured by, for example, a method described below.

Step of Preparing Glass Ceramic Material

First, $K_2O$, $B_2O_3$, $SiO_2$, and $Al_2O_3$ are weighed in a predetermined ratio and are mixed together in, for example, a crucible made of platinum.

Then, an obtained mixture is heat-treated to be melted. A heat treatment temperature is set to, for example, 1500° C. or higher and 1600° C. or lower (i.e., from 1500° C. to 1600° C.).

Thereafter, a glass material is prepared by quickly cooling a melt obtained as mentioned above.

The glass material preferably contains, assuming a total amount to be 100 weight %, 0.5 weight % or more and 5 weight % or less (i.e., from 0.5 weight % to 5 weight %) of K in terms of $K_2O$, 10 weight % or more and 25 weight % or less (i.e., from 10 weight % to 25 weight %) of B in terms of $B_2O_3$, 70 weight % or more and 85 weight % or less (i.e., from 70 weight % to 85 weight %) of Si in terms of $SiO_2$, and 0 weight % or more and 5 weight % or less (i.e., from 0 weight % to 5 weight %) of Al in terms of $Al_2O_3$.

Then, glass powder is prepared by pulverizing the glass material. A median size $D_{50}$ of the glass powder is set to, for example, 1 μm or greater and 3 μm or smaller (i.e., from 1 μm to 3 μm). Furthermore, quartz powder and alumina powder are prepared as a filler. A median size $D_{50}$ of the quartz powder and the alumina powder is set to, for example, 0.5 μm or greater and 2.0 μm or smaller (i.e., from 0.5 μm to 2.0 μm). Here, the median size $D_{50}$ of the glass powder, the quartz powder, and the alumina powder indicates a particle size at which the volume-based cumulative probability takes 50%.

Then, a glass ceramic material (dielectric glass material: nonmagnetic material) is prepared by adding the quartz powder and the alumina powder, as the filler, to the glass powder.

Step of Fabricating Glass Ceramic Sheet

First, a glass ceramic slurry is prepared by putting the glass ceramic material, an organic binder such as polyvinyl butyral resin, an organic solvent such as ethanol or toluene, a plasticizer, and so on into a ball mill together with PSZ media, and by mixing them.

Then, a glass ceramic sheet is fabricated by shaping the glass ceramic slurry into the form of a sheet of a predetermined thickness with a doctor blade method, for example, and by punching the sheet to have a predetermined shape. A thickness of the glass ceramic sheet is set to, for example, 20 μm or more and 30 μm or less (i.e., from 20 μm to 30 μm). The shape of the glass ceramic sheet is set to be, for example, rectangular.

Step of Preparing Ferrite Material

First, $Fe_2O_3$, ZnO, CuO, and NiO are weighed in a predetermined ratio. At that time, additives such as $Mn_3O_4$, $Co_3O_4$, $SnO_2$, $Bi_2O_3$, and $SiO_2$ may be added.

Then, the weighed materials, pure water, a dispersant, and so on are put into a ball mill together with PSZ media, mixed together, and then pulverized.

Then, the pulverized materials thus obtained are dried and calcined. A calcination temperature is set to, for example, 700° C. or higher and 800° C. or lower (i.e., from 700° C. to 800° C.). A calcination time is set to, for example, 2 hours or longer and 3 hours or shorter.

In such a manner, a powdery ferrite material (magnetic material) is prepared.

The ferrite material preferably contains, assuming a total amount to be 100 mol %, mol % or more and 49.5 mol % or less (i.e., from 40 mol % to 49.5 mol %) of Fe in terms of $Fe_2O_3$, 5 mol % or more and 35 mol % or less (i.e., from 5 mol % to 35 mol %) of Zn in terms of ZnO, 6 mol % or more and 12 mol % or less (i.e., from 6 mol % to 12 mol %) of Cu in terms of CuO, and 8 mol % or more and 40 mol % or less (i.e., from 8 mol % to 40 mol %) of Ni in terms of NiO.

In this step, multiple types of ferrite materials with different specific surface areas (average particle sizes) are prepared by changing a degree of pulverization when the above-mentioned pulverized materials are obtained.

Step of Fabricating Ferrite Sheets

First, a ferrite slurry is prepared by putting the powdery ferrite material, an organic binder such as polyvinyl butyral resin, an organic solvent such as ethanol or toluene, and so on into a ball mill together with PSZ media, and by mixing and pulverizing them.

Then, a ferrite sheet is fabricated by shaping the ferrite slurry into the form of a sheet of a predetermined thickness with the doctor blade method, for example, and by punching the sheet to have a predetermined shape. The shape of the ferrite sheet is set to be, for example, rectangular.

In this step, multiple types of ferrite sheets with different specific surface areas (average particle sizes) are fabricated by using the above-described multiple types of ferrite materials with different specific surface areas (average particle sizes). For example, a first ferrite sheet made of the ferrite material with the relatively large specific surface area (relatively small average particle size) and a second ferrite sheet made of the ferrite material with the relatively small specific surface area (relatively large average particle size) are fabricated.

Step of Forming Conductor Patterns

Conductor patterns for coil conductors corresponding to the coil conductors illustrated in FIG. 5, conductor patterns for lead-out conductors corresponding to the lead-out conductors illustrated in FIG. 5, and conductor patterns for via conductors corresponding to the via conductors illustrated in FIG. 5 are formed by coating a conductive paste, such as an Ag paste, on respective ones of the glass ceramic sheets with a screen printing method, for example. When the conductor patterns for the via conductors are formed, via holes are each previously formed at a predetermined position in the glass ceramic sheet by laser irradiation, and the conductive paste is then filled into the via hole.

Step of Fabricating Multilayer Body Block

First, the glass ceramic sheets on which the conductor patterns are formed are laminated in the order illustrated in FIG. 5, namely in the order of the insulating layer 15*aa*, the insulating layer 15*ab*, the insulating layer 15*ac*, and the insulating layer 15*ad* illustrated in FIG. 5, in the lamination direction (here, the height direction). Thereafter, as illustrated in FIG. 5, the glass ceramic sheet on which any conductor patterns are not formed is laminated on one principal surface of an obtained multilayer body in the lamination direction (here, the height direction), namely at the position of the insulating layer 15*ae* illustrated in FIG. 5.

Then, a predetermined number of ferrite sheets are laminated on each of both principal surfaces of the obtained multilayer body of the glass ceramic sheets in the lamination direction (here, the height direction). At that time, the first ferrite sheet and the second ferrite sheet are laminated in order on each of both the principal surfaces of the multilayer body of the glass ceramic sheets from a side nearer to the multilayer body of the glass ceramic sheets. More specifically, the first ferrite sheet is laminated at each of the positions of the insulating layer 16*aa* and the insulating layer 16*ba* illustrated in FIG. 5, and the second ferrite sheet is laminated at each of the positions of the insulating layer 16*ab* and the insulating layer 16*bb* illustrated in FIG. 5.

Then, a multilayer body block is fabricated by pressure-bonding an obtained multilayer body of the glass ceramic sheets and the ferrite sheets with, for example, warm isotropic pressing (WIP).

Step of Fabricating Bare Body and Coils

First, the multilayer body block is cut into pieces of a predetermined size by using, for example, a dicer, whereby separate individual chips are fabricated.

Then, the separate individual chips are fired. A firing temperature is set to, for example, 860° C. or higher and 920° C. or lower (i.e., from 860° C. to 920° C.). A firing time is set to, for example, 1 hour or longer and 2 hours or shorter.

With the firing of the separate individual chips, the glass ceramic sheets and the ferrite sheets each become the insulating layer. As a result, a multilayer portion of the glass ceramic sheets becomes the first glass layer. Two multilayer portions of the ferrite sheets sandwiching the multilayer portion of the glass ceramic sheets in the lamination direction (here, the height direction) become the first ferrite layer and the second ferrite layer in one-to-one relation. Moreover, the conductor patterns for the coil conductors, the conductor patterns for the lead-out conductors, and the conductor patterns for the via conductors become the coil conductors, the lead-out conductor, and the via conductors, respectively.

In such a manner, the bare body of the structure in which the first glass layer is sandwiched between the first ferrite layer and the second ferrite layer in the lamination direction (here, the height direction), the first coil disposed inside the first glass layer, and the second coil disposed inside the first glass layer and insulated from the first coil are fabricated. Here, the first lead-out conductor connected to the one end of the first coil and the third lead-out conductor connected to the one end of the second coil are exposed to the first side surface of the bare body. Moreover, the second lead-out conductor connected to the other end of the first coil and the fourth lead-out conductor connected to the other end of the second coil are exposed to the second side surface of the bare body.

Here, when, in the above-described Step of Fabricating Multilayer Body Block, the first ferrite sheet and the second ferrite sheet are laminated in order from the side nearer to the multilayer body of the glass ceramic sheets and conditions are adjusted such that the first ferrite sheet has a thickness of 10 μm and the second ferrite sheet has a thickness of greater than 10 μm after the firing in this step, the first inner region constituted by the first ferrite sheet, the first outer region constituted by a portion of the second ferrite sheet, and the first intermediate region constituted by the remaining portion of the second ferrite sheet are formed in the first ferrite layer obtained in this step.

On that occasion, in this step, since the ferrite material has the relatively large specific surface area (relatively small average crystal particle size) in the first ferrite sheet in contact with the glass ceramic sheet, a component of the glass ceramic material becomes easier to diffuse into the first ferrite sheet from the glass ceramic sheet when the separate individual chips are fired. Therefore, the adhesion between the glass ceramic sheet and the first ferrite sheet is increased with the presence of the diffused component of the glass ceramic material. As a result, the adhesion between the first glass layer and the first ferrite layer obtained in this step is increased.

On the other hand, when the component of the glass ceramic material becomes easier to diffuse into the first ferrite sheet from the glass ceramic sheet, sintering (crystallization) of the ferrite material is more likely to be impeded in the first ferrite sheet. As a result, in the first ferrite layer obtained in this step, the average crystal particle size of the ferrite in the first inner region constituted by the first ferrite sheet becomes smaller than that in the first intermediate region constituted by the second ferrite sheet. Along with the above-described result, in the first ferrite layer obtained in this step, the area rate of the pores in the first inner region constituted by the first ferrite sheet becomes larger than that in the first intermediate region constituted by the second ferrite sheet.

In the second ferrite layer obtained in this step, the second inner region constituted by the first ferrite sheet, the second outer region constituted by a portion of the second ferrite sheet, and the second intermediate region constituted by the remaining portion of the second ferrite sheet are also formed as in the first ferrite layer.

On that occasion as well, the adhesion between the first glass layer and the second ferrite layer obtained in this step is increased on the basis of the principle similar to that described above.

Furthermore, in the second ferrite layer obtained in this step, the average crystal particle size of the ferrite in the second inner region constituted by the first ferrite sheet becomes smaller than that in the second intermediate region constituted by the second ferrite sheet on the basis of the principle similar to that described above. Along with the above-described result, in the second ferrite layer obtained in this step, the area rate of the pores in the second inner region constituted by the first ferrite sheet becomes larger than that in the second intermediate region constituted by the second ferrite sheet.

As seen from the above description, for the ferrite layer obtained in this step, the average crystal particle size of the ferrite in the inner region and the area rate of the pores in the inner region can be adjusted by changing the degree of the pulverization when the above-mentioned pulverized materials are obtained in the above-described Step of Preparing Ferrite Material, for example, such that the specific surface area (average particle size) of the ferrite material of the first ferrite sheet becoming the inner region of the ferrite layer later is changed.

Corner portions and ridge portions of the bare body may be rounded, for example, by putting the bare body into a rotary barrel machine together with media and by performing barrel polishing on the bare body.

Step of Forming Outer Electrodes

First, a conductive paste, for example, a paste including Ag and glass frit, is coated onto at least total four positions, namely a position in the first side surface of the b are body where the first lead-out conductor is exposed, a position in the second side surface of the bare body where the second lead-out conductor is exposed, a position in the first side surface of the bare body where the third lead-out conductor is exposed, and a position in the second side surface of the bare body where the fourth lead-out conductor is exposed.

Then, obtained coating films are baked, whereby underlying electrodes are formed on the surfaces of the bare body.

Then, plated electrodes, for example, a Ni-plated electrode and a Sn-plated electrode, are successively formed on a surface of each of the underlying electrodes by, for example, electrolytic plating.

In such a manner, the first outer electrode electrically connected to the one end of the first coil through the first lead-out conductor, the second outer electrode electrically connected to the other end of the first coil through the second lead-out conductor, the third outer electrode electrically connected to the one end of the second coil through the third lead-out conductor, and the fourth outer electrode electrically connected to the other end of the second coil through the fourth lead-out conductor are formed on the surfaces of the bare body.

Through the above-described processes, the coil component 1A is manufactured.

Second Embodiment

In a coil component according to a second embodiment of the present disclosure, a bare body further includes a second glass layer adjacent to the first ferrite layer on a side opposite to the first glass layer and a third glass layer adjacent to the second ferrite layer on a side opposite to the first glass layer. The coil component according to the second embodiment of the present disclosure is similar to the coil component according to the first embodiment of the present disclosure except for the above-mentioned point.

Figure 6:
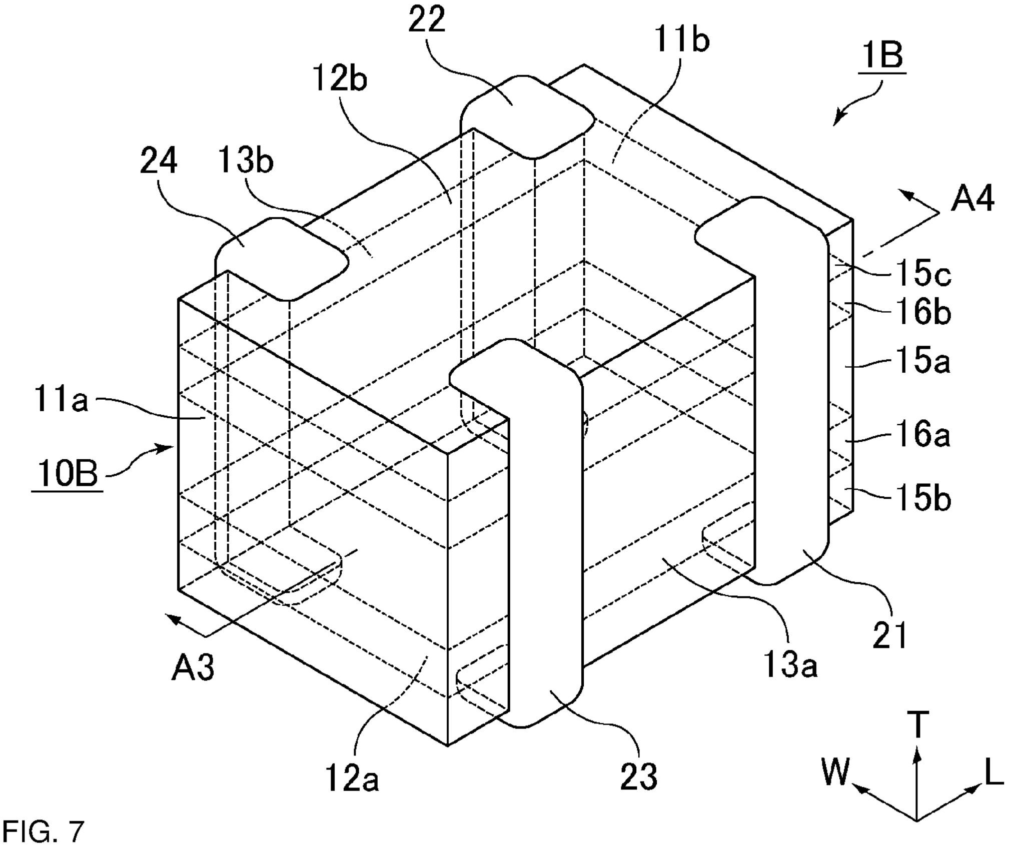
FIG. 6 is a schematic perspective view illustrating an example of a coil component according to a second embodiment of the present disclosure.

FIG. 6 is a schematic perspective view illustrating an example of the coil component according to the second embodiment of the present disclosure.

In a coil component 1B illustrated in FIG. 6, a bare body 10B further include a second glass layer 15*b* and a third glass layer 15*c* in addition to the configuration of the bare body 10A, namely in addition to the first glass layer 15*a*, the first ferrite layer 16*a*, and the second ferrite layer 16*b*.

In the lamination direction (here, the height direction T), the second glass layer 15*b* is adjacent to the first ferrite layer 16*a* on a side opposite to the first glass layer 15*a*, and the third glass layer 15*c* is adjacent to the second ferrite layer 16*b* on a side opposite to the first glass layer 15*a*. Stated another way, in the bare body 10B, the first ferrite layer 16*a* is sandwiched between the first glass layer 15*a* and the second glass layer 15*b*, and the second ferrite layer 16*b* is sandwiched between the first glass layer 15*a* and the third glass layer 15*c* in the lamination direction (here, the height direction T).

The number of insulating layers constituting the second glass layer 15*b* is not limited to a particular value and may be one or two or more.

The second glass layer 15*b* is made of a glass ceramic material.

The second glass layer 15*b* preferably includes a glass material containing K, B, and Si. In other words, the glass ceramic material constituting the second glass layer 15*b* preferably includes the glass material containing K, B, and Si.

The glass material included in the second glass layer 15*b* preferably contains, assuming a total amount to be 100 weight %, 0.5 weight % or more and 5 weight % or less (i.e., from 0.5 weight % to 5 weight %) of K in terms of $K_2O$, 10 weight % or more and 25 weight % or less (i.e., from 10 weight % to 25 weight %) of B in terms of $B_2O_3$, 70 weight % or more and 85 weight % or less (i.e., from 70 weight % to 85 weight %) of Si in terms of $SiO_2$, and 0 weight % or more and 5 weight % or less (i.e., from 0 weight % to 5 weight %) of Al in terms of $Al_2O_3$.

The second glass layer 15*b* preferably includes a filler containing at least one of quartz and alumina. In other words, the glass ceramic material constituting the second glass layer 15*b* preferably includes the filler containing at least one of the quartz and the alumina. With the glass ceramic material of the second glass layer 15*b* containing the quartz as the filler, high frequency characteristics of the coil component 1B are made easier to improve. Furthermore, with the glass ceramic material of the second glass layer 15*b* containing the alumina as the filler, mechanical strength of the bare body 10B is made easier to improve.

When the glass ceramic material constituting the second glass layer 15*b* contains the quartz and the alumina as the filler, the glass ceramic material preferably contains, assuming a total amount to be 100 weight %, 60 weight % or more and 66 weight % or less (i.e., from 60 weight % to 66 weight %) of the glass material, 34 weight % or more and 37 weight % or less (i.e., from 34 weight % to 37 weight %) of the quartz as the filler, and 0.5 weight % or more and 4 weight % or less (i.e., from 0.5 weight % to 4 weight %) of the alumina as the filler.

The number of insulating layers constituting the third glass layer 15*c* is not limited to a particular value and may be one or two or more.

The third glass layer 15*c* is made of a glass ceramic material.

The third glass layer 15*c* preferably includes a glass material containing K, B, and Si. In other words, the glass ceramic material constituting the third glass layer 15*c* preferably includes the glass material containing K, B, and Si.

The glass material included in the third glass layer 15*c* preferably contains, assuming a total amount to be 100 weight %, 0.5 weight % or more and 5 weight % or less (i.e., from 0.5 weight % to 5 weight %) of K in terms of $K_2O$, 10 weight % or more and 25 weight % or less (i.e., from 10 weight % to 25 weight %) of B in terms of $B_2O_3$, 70 weight % or more and 85 weight % or less (i.e., from 70 weight % to 85 weight %) of Si in terms of $SiO_2$, and 0 weight % or more and 5 weight % or less (i.e., from 0 weight % to 5 weight %) of Al in terms of $Al_2O_3$.

The third glass layer 15*c* preferably includes a filler containing at least one of quartz and alumina. In other words, the glass ceramic material constituting the third glass layer 15*c* preferably includes the filler containing at least one of the quartz and the alumina. With the glass ceramic material of the third glass layer 15*c* containing the quartz as the filler, the high frequency characteristics of the coil component 1B are made easier to improve. Furthermore, with the glass ceramic material of the third glass layer 15*c* containing the alumina as the filler, the mechanical strength of the bare body 10B is made easier to increase.

When the glass ceramic material constituting the third glass layer 15*c* contains the quartz and the alumina as the filler, the glass ceramic material preferably contains, assuming a total amount to be 100 weight %, 60 weight % or more and 66 weight % or less (i.e., from 60 weight % to 66 weight %) of the glass material, 34 weight % or more and 37 weight % or less (i.e., from 34 weight % to 37 weight %) of the quartz as the filler, and 0.5 weight % or more and 4 weight % or less (i.e., from 0.5 weight % to 4 weight %) of the alumina as the filler.

The glass ceramic materials constituting the first glass layer 15*a*, the second glass layer 15*b*, and the third glass layer 15*c* are preferably the same, but those materials may be different from one another or different in part.

Respective sizes of the first glass layer 15*a*, the second glass layer 15*b*, the third glass layer 15*c*, the first ferrite layer 16*a*, and the second ferrite layer 16*b* in the height direction T may be the same, different from one another, or different in part. When the sizes of the first glass layer 15*a*, the second glass layer 15*b*, the third glass layer 15*c*, the first ferrite layer 16*a*, and the second ferrite layer 16*b* in the height direction T are different from one another or different in part, a relationship in size value among those layers is not limited to a particular one.

Figure 7:
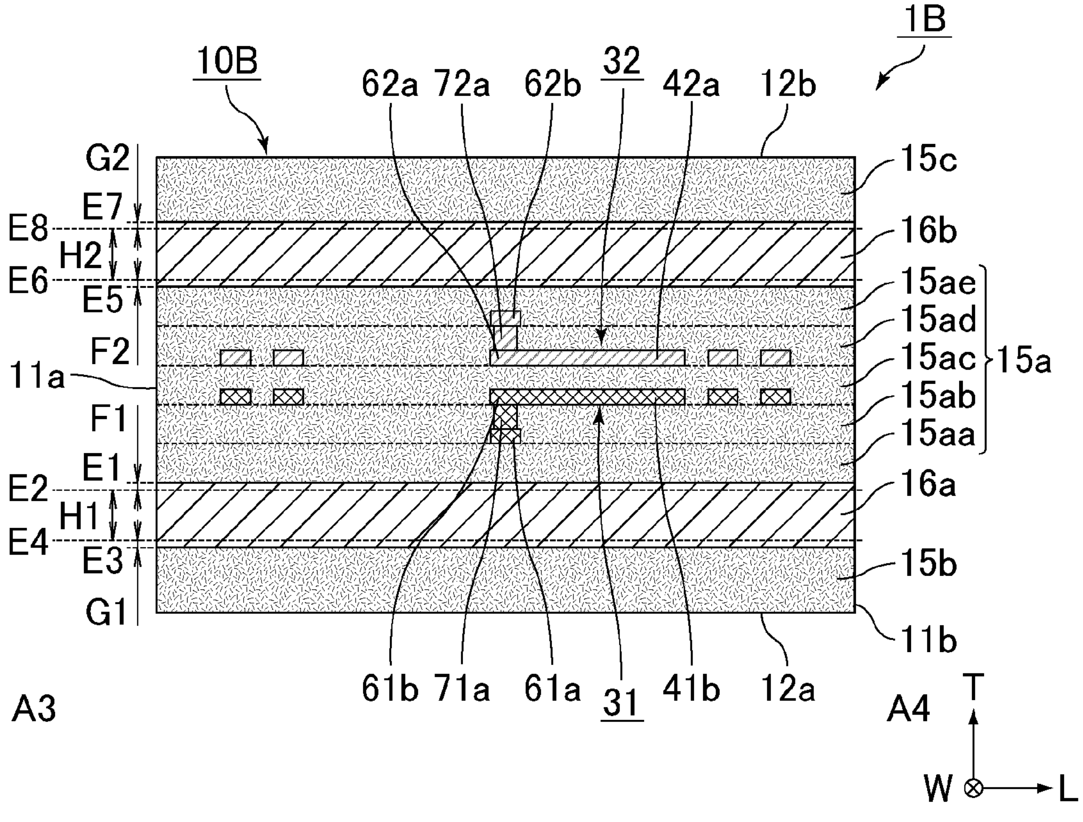
FIG. 7 is a schematic sectional view illustrating an example of a cross-section, taken along a line segment A3-A4, of the coil component illustrated in FIG. 6.

FIG. 7 is a schematic sectional view illustrating an example of a cross-section, taken along a line segment A3-A4, of the coil component illustrated in FIG. 6.

Assuming, as illustrated in FIG. 7, that, in the first ferrite layer 16*a*, a position of a principal surface on a side nearer to the first glass layer 15*a* is denoted by a first position E1, a position 10 μm away from the first position E1 in the lamination direction (here, the height direction T) is denoted by a second position E2, a position of a principal surface on a side opposite to the first glass layer 15*a*, namely a position of a principal surface on a side nearer to the second glass layer 15*b*, is denoted by a third position E3, a position 10 μm away from the third position E3 in the lamination direction (here, the height direction T) is denoted by a fourth position E4, a region between the first position E1 and the second position E2 is denoted by a first inner region F1, a region between the third position E3 and the fourth position E4 is denoted by a first outer region G1, and a region between the second position E2 and the fourth position E4 is denoted by a first intermediate region H1, the coil component 1B satisfies both the above-described features (1) and (2) as in the coil component 1A. In addition, the coil component 1B preferably satisfies both features (5) and (6) given below:

(5) An area rate of pores in the first outer region G1 is greater than that in the first intermediate region H1.

(6) An average crystal particle size of ferrite in the first outer region G1 is smaller than that in the first intermediate region H1.

In the coil component 1B, since the above-described features (5) and (6) are both satisfied, adhesion (for example, bonding strength) between the second glass layer 15*b* and the first ferrite layer 16*a* is increased.

Assuming the area rate of the pores in the first outer region G1 to be 1, the area rate of the pores in the first intermediate region H1 is preferably 0.3 or more and 0.8 or less (i.e., from 0.3 to 0.8). In this case, the adhesion between the second glass layer 15*b* and the first ferrite layer 16*a* is greatly increased.

The area rates of the pores in the first inner region F1 and the first outer region G1 may be the same or different from each other. When the area rates of the pores in the first inner region F1 and the first outer region G1 are different from each other, a relationship in value of the area rate between those layers is not limited to a particular one.

Assuming the average crystal particle size of the ferrite in the first outer region G1 to be 1, the average crystal particle size of the ferrite in the first intermediate region H1 is preferably 1.5 or more and 2.5 or less (i.e., from 1.5 to 2.5). In this case, the adhesion between the second glass layer 15*b* and the first ferrite layer 16*a* is greatly increased.

The average crystal particle sizes of the ferrite in the first inner region F1 and the first outer region G1 may be the same or different from each other. When the average crystal particle sizes of the ferrite in the first inner region F1 and the first outer region G1 are different from each other, a relationship in value of the average crystal particle size between those layers is not limited to a particular one.

Assuming, as illustrated in FIG. 7, that, in the second ferrite layer 16*b*, a position of a principal surface on a side nearer to the first glass layer 15*a* is denoted by a fifth position E5, a position 10 μm away from the fifth position E5 in the lamination direction (here, the height direction T) is denoted by a sixth position E6, a position of a principal surface on a side opposite to the first glass layer 15*a*, namely a position of a principal surface on a side nearer to the third glass layer 15*c*, is denoted by a seventh position E7, a position 10 μm away from the seventh position E7 in the lamination direction (here, the height direction T) is denoted by an eighth position E8, a region between the fifth position E5 and the sixth position E6 is denoted by a second inner region F2, a region between the seventh position E7 and the eighth position E8 is denoted by a second outer region G2, and a region between the sixth position E6 and the eighth position E8 is denoted by a second intermediate region H2, the coil component 1B preferably satisfies both features (7) and (8) given below:

(7) An area rate of pores in the second outer region G2 is greater than that in the second intermediate region H2.

(8) An average crystal particle size of ferrite in the second outer region G2 is smaller than that in the second intermediate region H2.

In the coil component 1B, since the above-described features (7) and (8) are both satisfied, adhesion (for example, bonding strength) between the third glass layer 15*c* and the second ferrite layer 16*b* is increased.

Assuming the area rate of the pores in the second outer region G2 to be 1, the area rate of the pores in the second intermediate region H2 is preferably 0.3 or more and 0.8 or less (i.e., from 0.3 to 0.8). In this case, the adhesion between the third glass layer 15*c* and the second ferrite layer 16*b* is greatly increased.

The area rates of the pores in the second inner region F2 and the second outer region G2 may be the same or different from each other. When the area rates of the pores in the second inner region F2 and the second outer region G2 are different from each other, a relationship in value of the area rate between those layers is not limited to a particular one.

Assuming the average crystal particle size of the ferrite in the second outer region G2 to be 1, the average crystal particle size of the ferrite in the second intermediate region H2 is preferably 1.5 or more and 2.5 or less (i.e., from 1.5 to 2.5). In this case, the adhesion between the third glass layer 15*c* and the second ferrite layer 16*b* is greatly increased.

The average crystal particle sizes of the ferrite in the second inner region F2 and the second outer region G2 may be the same or different from each other. When the average crystal particle sizes of the ferrite in the second inner region F2 and the second outer region G2 are different from each other, a relationship in value of the average crystal particle size between those layers is not limited to a particular one.

The coil component 1B is manufactured, for example, in a similar manner to the coil component 1A except for performing Step of Fabricating Multilayer Block Body as described below.

Step of Fabricating Multilayer Body Block

First, the glass ceramic sheets on which the conductor patterns are formed are laminated in the order illustrated in FIG. 5 in the lamination direction (here, the height direction). At that time, a predetermined number of glass ceramic sheets on each of which any conductor patterns are not formed are laminated on at least one principal surface of an obtained multilayer body in the lamination direction (here, the height direction).

Then, a predetermined number of ferrite sheets are laminated on each of both principal surfaces of the obtained multilayer body of the glass ceramic sheets in the lamination direction (here, the height direction). At that time, for example, the first ferrite sheet, the second ferrite sheet, and the first ferrite sheet are laminated in order on each of both the principal surfaces of the multilayer body of the glass ceramic sheets from a side nearer to the multilayer body of the glass ceramic sheets.

Then, a predetermined number of glass ceramic sheets on each of which any conductor patterns are not formed are laminated on each of two obtained multilayer portions of the ferrite sheets in the lamination direction (here, the height direction).

Then, a multilayer body block is fabricated by pressure-bonding an obtained multilayer body of the glass ceramic sheets and the ferrite sheets with, for example, the warm isotropic pressing.

Thereafter, in the Step of Fabricating Bare Body and Coils, separate individual chips are obtained and fired, whereby the multilayer portion of the glass ceramic sheets disposed on an inner side becomes the first glass layer. Two multilayer portions of the ferrite sheets sandwiching the multilayer portion of the glass ceramic sheets in the lamination direction (here, the height direction) become the first ferrite layer and the second ferrite layer in one-to-one relation. Moreover, two multilayer portions of the glass ceramic sheets disposed on an outer side of the two multilayer portions of the ferrite sheets become the second glass layer and the third glass layer in one-to-one relation.

Here, when, in the Step of Fabricating Multilayer Body Block, the first ferrite sheet, the second ferrite sheet, and the first ferrite sheet are laminated in order from the side nearer to the multilayer body of the glass ceramic sheets and conditions are adjusted such that both the first ferrite sheets each have a thickness of 10 μm after the firing in the Step of Fabricating Bare Body and Coils, the first inner region constituted by one of the first ferrite sheets, the first intermediate region constituted by the second ferrite sheet, and the first outer region constituted by the other first ferrite sheet are formed in the first ferrite layer obtained in the Step of Fabricating Bare Body and Coils. Furthermore, in the second ferrite layer obtained in the Step of Fabricating Bare Body and Coils, the second inner region constituted by one of the first ferrite sheets, the second intermediate region constituted by the second ferrite sheet, and the second outer region constituted by the other first ferrite sheet are formed.

On that occasion, in the Step of Fabricating Bare Body and Coils, adhesion between the second glass layer and the first ferrite layer and adhesion between the third glass layer and the second ferrite layer are increased on the basis of the principle similar to that described above.

On the other hand, in the first ferrite layer obtained in the Step of Fabricating Bare Body and Coils, the average crystal particle size of the ferrite in the first outer region constituted by the other first ferrite sheet becomes smaller than that in the first intermediate region constituted by the second ferrite sheet on the basis of the principle similar to that described above. Along with the above-described result, in the first ferrite layer obtained in the Step of Fabricating Bare Body and Coils, the area rate of the pores in the first outer region constituted by the other first ferrite sheet becomes larger than that in the first intermediate region constituted by the second ferrite sheet.

Furthermore, in the second ferrite layer obtained in the Step of Fabricating Bare Body and Coils, the average crystal particle size of the ferrite in the second outer region constituted by the other first ferrite sheet becomes smaller than that in the second intermediate region constituted by the second ferrite sheet on the basis of the principle similar to that described above. Along with the above-described result, in the second ferrite layer obtained in the Step of Fabricating Bare Body and Coils, the area rate of the pores in the second outer region constituted by the other first ferrite sheet becomes larger than that in the second intermediate region constituted by the second ferrite sheet.

EXAMPLE

EXAMPLE disclosing the coil component of the present disclosure in detail will be described below. Note that the present disclosure is not limited to only the following EXAMPLE.

Example 1

The coil component according to the first embodiment of the present disclosure was manufactured as a coil component of EXAMPLE 1 by a method described below.

Step of Preparing Glass Ceramic Material

First, $K_2O$, $B_2O_3$, $SiO_2$, and $Al_2O_3$ were weighed in a predetermined ratio and were mixed together in, for example, a crucible made of platinum.

Then, an obtained mixture was heat-treated to be melted. A heat treatment temperature was set to 1500° C.

Thereafter, a glass material was prepared by quickly cooling a melt obtained as mentioned above.

Then, glass powder was prepared by pulverizing the glass material. A median size $D_{50}$ of the glass powder was set to 1 μm or greater and 3 μm or smaller (i.e., from 1 μm to 3 μm). Furthermore, quartz powder and alumina powder were prepared as a filler. A median size $D_{50}$ of the quartz powder and the alumina powder was set to 0.5 μm or greater and 2.0 μm or smaller (i.e., from 0.5 μm to 2.0 μm).

Then, a glass ceramic material was prepared by adding the quartz powder and the alumina powder, as the filler, to the glass powder.

Step of Fabricating Glass Ceramic Sheet

First, a glass ceramic slurry was prepared by putting the glass ceramic material, an organic binder such as polyvinyl butyral resin, an organic solvent such as ethanol or toluene, and a plasticizer into a ball mill together with PSZ media, and by mixing them.

Then, a glass ceramic sheet was fabricated by shaping the glass ceramic slurry into the form of a sheet of a predetermined thickness with the doctor blade method and by punching the sheet to have a predetermined shape. A thickness of the glass ceramic sheet was set to, for example, 20 μm or more and 30 μm or less (i.e., from 20 μm to 30 μm). The shape of the glass ceramic sheet was set to be rectangular.

Step of Preparing Ferrite Material

First, $Fe_2O_3$, ZnO, CuO, and NiO were weighed in a predetermined ratio.

Then, the weighed materials, pure water, and a dispersant were put into a ball mill together with PSZ media, mixed together, and then pulverized.

Then, the pulverized materials thus obtained were dried and calcined. A calcination temperature was set to 800° C. A calcination time was set to 2 hours.

In such a manner, a powdery ferrite material was prepared.

In this step, two types of ferrite materials with different specific surface areas (average particle sizes) were prepared by changing a degree of pulverization when the above-mentioned pulverized materials were obtained.

Step of Fabricating Ferrite Sheets

First, a ferrite slurry was prepared by putting the powdery ferrite material, an organic binder such as polyvinyl butyral resin, and an organic solvent such as ethanol or toluene into a ball mill together with PSZ media, and by mixing and pulverizing them.

Then, a ferrite sheet was fabricated by shaping the ferrite slurry into the form of a sheet of a predetermined thickness with the doctor blade method and by punching the sheet to have a predetermined shape. The shape of the ferrite sheet was set to be rectangular.

In this step, two types of ferrite sheets with different specific surface areas (average particle sizes) of the ferrite materials were fabricated by using the above-described two types of ferrite materials with different specific surface areas (average particle sizes). More specifically, a first ferrite sheet made of the ferrite material with the relatively large specific surface area (relatively small average particle size) and a second ferrite sheet made of the ferrite material with the relatively small specific surface area (relatively large average particle size) were fabricated. A thickness of the first ferrite sheet was set to become 10 μm after firing in a later step. A thickness of the second ferrite sheet was set to become 20 μm after the firing in the later step.

Step of Forming Conductor Patterns

Conductor patterns for coil conductors corresponding to the coil conductors illustrated in FIG. 5, conductor patterns for lead-out conductors corresponding to the lead-out conductors illustrated in FIG. 5, and conductor patterns for via conductors corresponding to the via conductors illustrated in FIG. 5 were formed by coating an Ag paste on respective ones of the glass ceramic sheets by a screen printing method. When the conductor patterns for the via conductors were each formed, a via hole was previously formed at a predetermined position in the glass ceramic sheet by laser irradiation, and the Ag paste was then filled into the via hole.

Step of Fabricating Multilayer Body Block

First, the glass ceramic sheets on which the conductor patterns were formed were laminated in the order illustrated in FIG. 5, namely in the order of the insulating layer **15*aa*, the insulating layer 15*ab*, the insulating layer 15*ac*, and the insulating layer 15***ad* illustrated in FIG. 5, in the lamination direction (here, the height direction). Thereafter, as illustrated in FIG. 5, the glass ceramic sheet on which any conductor patterns were not formed was laminated on one principal surface of an obtained multilayer body in the lamination direction (here, the height direction), namely at a position of the insulating layer 15*ae* illustrated in FIG. 5.

Then, the first ferrite sheet and the second ferrite sheet were laminated in order on each of both the principal surfaces of the obtained multilayer body of the glass ceramic sheets in the lamination direction (here, the height direction) from a side nearer to the multilayer body of the glass ceramic sheets. More specifically, the first ferrite sheet was laminated at each of the positions of the insulating layer 16*aa* and the insulating layer 16*ba* illustrated in FIG. 5, and the second ferrite sheet was laminated at each of the positions of the insulating layer 16*ab* and the insulating layer 16*bb* illustrated in FIG. 5.

Then, a multilayer body block was fabricated by pressure-bonding an obtained multilayer body of the glass ceramic sheets and the ferrite sheets with, for example, the warm isotropic pressing. As pressure-bonding conditions, a temperature was set to 80° C., and a pressure was set to 100 MPa.

Step of Fabricating Bare Body and Coils

First, the multilayer body block was cut into pieces of a predetermined size by using a dicer, whereby separate individual chips were fabricated.

Then, the separate individual chips were fired. A firing temperature was set to 910° C. A firing time was set to 2 hours.

With the firing of the separate individual chips, the glass ceramic sheets and the ferrite sheets each became the insulating layer. As a result, a multilayer portion of the glass ceramic sheets became the first glass layer. Two multilayer portions of the ferrite sheets sandwiching the multilayer portion of the glass ceramic sheets in the lamination direction (here, the height direction) became the first ferrite layer and the second ferrite layer in one-to-one relation. Moreover, the conductor patterns for the coil conductors, the conductor patterns for the lead-out conductors, and the conductor patterns for the via conductors became the coil conductors, the lead-out conductor, and the via conductors, respectively.

In such a manner, the bare body of the structure in which the first glass layer was sandwiched between the first ferrite layer and the second ferrite layer in the lamination direction (here, the height direction), the first coil disposed inside the first glass layer, and the second coil disposed inside the first glass layer and insulated from the first coil were fabricated. Here, the first lead-out conductor connected to the one end of the first coil and the third lead-out conductor connected to the one end of the second coil were exposed to the first side surface of the bare body. Moreover, the second lead-out conductor connected to the other end of the first coil and the fourth lead-out conductor connected to the other end of the second coil were exposed to the second side surface of the bare body.

In the first ferrite layer obtained in this step, the first inner region constituted by the first ferrite sheet, the first outer region constituted by a portion of the second ferrite sheet, and the first intermediate region constituted by the remaining portion of the second ferrite sheet were formed.

Furthermore, in the second ferrite layer obtained in this step, the second inner region constituted by the first ferrite sheet, the second outer region constituted by a portion of the second ferrite sheet, and the second intermediate region constituted by the remaining portion of the second ferrite sheet were formed.

Thereafter, corner portions and ridge portions of the bare body were rounded by putting the bare body into a rotary barrel machine together with media and by performing barrel polishing on the bare body.

Step of Forming Outer Electrodes

First, a conductive paste including Ag and glass frit was coated onto at least total four positions, namely a position in the first side surface of the bare body where the first lead-out conductor was exposed, a position in the second side surface of the bare body where the second lead-out conductor was exposed, a position in the first side surface of the bare body where the third lead-out conductor was exposed, and a position in the second side surface of the bare body where the fourth lead-out conductor was exposed.

Then, obtained coating films were baked, whereby underlying electrodes were formed on the surfaces of the bare body. A temperature of baking the coating films was set to 800° C.

Then, a Ni-plated electrode and a Sn-plated electrode were successively formed on a surface of each of the underlying electrodes by electrolytic plating.

In such a manner, the first outer electrode electrically connected to the one end of the first coil through the first lead-out conductor, the second outer electrode electrically connected to the other end of the first coil through the second lead-out conductor, the third outer electrode electrically connected to the one end of the second coil through the third lead-out conductor, and the fourth outer electrode electrically connected to the other end of the second coil through the fourth lead-out conductor were formed on the surfaces of the bare body.

Through the above-described processes, the coil component of EXAMPLE 1 was manufactured.

In the coil component of EXAMPLE 1, the size in the length direction was 0.65 mm, the size in the height direction was 0.30 mm, and the size in the width direction was 0.50 mm.

Comparative Example 1

A coil component of COMPARATIVE EXAMPLE 1 was manufactured in a similar manner to the coil component of EXAMPLE 1 except for laminating the second ferrite sheet at all the positions of the insulating layer 16*aa*, the insulating layer 16*ab*, the insulating layer 16*ba*, and the insulating layer 16*bb*, illustrated in FIG. 5, in the Step of Fabricating Multilayer Body Block.

Evaluation

For each of the coil component of EXAMPLE 1 and the coil component of COMPARATIVE EXAMPLE 1, evaluation was performed as follows after, as described above, determining the first inner region, the first outer region, and the first intermediate region in the first ferrite layer, and further determining the second inner region, the second outer region, and the second intermediate region in the second ferrite layer. Results are listed in Table 1 and Table 2.

Area Rate of Pores in Ferrite Layer

First, after sealing the periphery of the coil component with resin as required, the coil component was polished in the width direction, thereby exposing a cross-section substantially in a central portion in the width direction, the cross-section extending along the length direction and the height direction. Then, an image of the exposed cross-section was taken by a scanning electron microscope (SEM) with a magnification of 5000 and a visual field size of 8 μm square. Then, an image analysis was performed on the taken cross-section image of 8 μm square with image analysis software, and the area rate of the pores in a target region of each ferrite layer was measured. In more detail, after binarizing the taken cross-section image of 8 μm square with the image analysis software "GIMP", the area rate of the pores in the target region of the ferrite layer (namely, a ratio of the number of pixels in all of regions where the pores were present to the number of pixels in the entire target region of the ferrite layer) was measured by using "A Image-Kun" (registered trademark) made by Asahi Kasei Engineering Corporation. The above-described measurement of the area rate of the pores was performed on each of cross-section images taken at five positions, and an average value of obtained five measured values was determined as the area rate of the pores in the target region of the ferrite layer.

Table 1 and Table 2 indicate not only the measured values of the area rates of the pores in the target regions of the individual ferrite layers, but also ratios of the area rates of the pores in the target regions when the area rate of the pores in the inner region for the same ferrite layer is assumed to be 1.

Average Crystal Particle Size of Ferrite in Ferrite Layer

First, by performing an image analysis on the cross-section image of 8 μm square used in measuring the area rate of the pores with the image analysis software "A Image-Kun" made by Asahi Kasei Engineering Corporation, an area occupied by one ferrite crystal particle in the target region of each ferrite layer was determined, and an equivalent circle diameter was determined from that area. Then, the above-described measurement of the equivalent circle diameter was performed on twenty ferrite crystal particles in the same cross-section image, and an average value of obtained twenty measured values was determined as the average crystal particle size of the ferrite in the target region of the ferrite layer.

Table 1 and Table 2 indicate not only the measured values of the average crystal particle sizes of the ferrite in the target regions of the individual ferrite layers, but also ratios of the average crystal particle sizes of the ferrite in the target regions when the average crystal particle size of the ferrite in the inner region for the same ferrite layer is assumed to be 1.

Adhesion Between Glass Layer and Ferrite Layer

By observing an interface between the first glass layer and the first ferrite layer and an interface between the first glass layer and the second ferrite layer in the coil component with a microscope, adhesion between the glass layer and the ferrite layer was evaluated on the basis of determination criteria given below.

○ (Good): no gaps were found between the glass layer and the ferrite layer.

x (Poor): gaps were found between the glass layer and the ferrite layer.

TABLE 1

| EXAMPLE 1 | | First Ferrite Layer | | | Second Ferrite Layer | | |
|---|---|---|---|---|---|---|---|
| | | First Inner Region | First Intermediate Region | First Outer Region | Second Inner Region | Second Intermediate Region | Second Outer Region |
| Area Rate of Pores | Measured Value (%) | 2.8 | 1.5 | 0.9 | 3.0 | 1.6 | 1.0 |
| | Ratio | 1 | 0.54 | 0.32 | 1 | 0.53 | 0.33 |
| Average Crystal Particle Size of Ferrite | Measured Value (μm) | 0.34 | 0.67 | 0.65 | 0.32 | 0.70 | 0.66 |
| | Ratio | 1 | 1.97 | 1.91 | 1 | 2.19 | 2.06 |
| Adhesion to First Glass Layer | | | ○ | | | ○ | |

TABLE 2

| COMPARATIVE EXAMPLE 1 | | First Ferrite Layer | | | Second Ferrite Layer | | |
|---|---|---|---|---|---|---|---|
| | | First Inner Region | First Intermediate Region | First Outer Region | Second Inner Region | Second Intermediate Region | Second Outer Region |
| Area Rate of Pores | Measured Value (%) | 1.2 | 1.3 | 1.1 | 1.4 | 1.6 | 1.2 |
| | Ratio | 1 | 1.08 | 0.92 | 1 | 1.14 | 0.86 |
| Average Crystal Particle Size of Ferrite | Measured Value (μm) | 0.75 | 0.70 | 0.68 | 0.76 | 0.75 | 0.60 |
| | Ratio | 1 | 0.93 | 0.91 | 1 | 0.99 | 0.79 |
| Adhesion to First Glass Layer | | | x | | | x | |

As seen from Table 1, the adhesion between the first glass layer and the first ferrite layer was good in the coil component of EXAMPLE 1 in which, for the first ferrite layer, the area rate of the pores in the first inner region was greater than that in the first intermediate region and the average crystal particle size of the ferrite in the first inner region was smaller than that in the first intermediate region. Furthermore, the adhesion between the first glass layer and the second ferrite layer was good in the coil component of EXAMPLE 1 in which, for the second ferrite layer, the area rate of the pores in the second inner region was greater than that in the second intermediate region and the average crystal particle size of the ferrite in the second inner region was smaller than that in the second intermediate region.

On the other hand, as seen from Table 2, the adhesion between the first glass layer and the first ferrite layer was insufficient in the coil component of COMPARATIVE EXAMPLE 1 in which, for the first ferrite layer, the area rate of the pores in the first inner region was smaller than that in the first intermediate region and the average crystal particle size of the ferrite in the first inner region was greater than that in the first intermediate region. Furthermore, the adhesion between the first glass layer and the second ferrite layer was insufficient in the coil component of COMPARATIVE EXAMPLE in which, for the second ferrite layer, the area rate of the pores in the second inner region was smaller than that in the second intermediate region and the average crystal particle size of the ferrite in the second inner region was greater than that in the second intermediate region.

The features given below are disclosed in this Specification.

<1> A coil component comprising a bare body including, in a lamination direction, a first glass layer, a first ferrite layer adjacent to one principal surface side of the first glass layer, and a second ferrite layer adjacent to the other principal surface side of the first glass layer; a coil disposed inside the first glass layer; and outer electrodes disposed on surfaces of the bare body and electrically connected to the coil. Assuming that, in the first ferrite layer, a position of a principal surface on a side nearer to the first glass layer is denoted by a first position, a position 10 μm away from the first position in the lamination direction is denoted by a second position, a position of a principal surface on a side opposite to the first glass layer is denoted by a third position, a position 10 μm away from the third position in the lamination direction is denoted by a fourth position, a region between the first position and the second position is denoted by a first inner region, a region between the third position and the fourth position is denoted by a first outer region, and a region between the second position and the fourth position is denoted by a first intermediate region. Also, an area rate of pores in the first inner region is greater than an area rate of pores in the first intermediate region, and an average crystal particle size of ferrite in the first inner region is smaller than an average crystal particle size of ferrite in the first intermediate region.

<2> The coil component according to <1>, wherein, assuming the area rate of the pores in the first inner region to be 1, the area rate of the pores in the first intermediate region is 0.3 or more and 0.8 or less (i.e., from 0.3 to 0.8).

<3> The coil component according to <1> or <2>, wherein, assuming the average crystal particle size of the ferrite in the first inner region to be 1, the average crystal particle size of the ferrite in the first intermediate region is 1.5 or more and 2.5 or less (i.e., from 1.5 to 2.5).

<4> The coil component according to any one of <1> to <3>, wherein, assuming that, in the second ferrite layer, a position of a principal surface on a side nearer to the first glass layer is denoted by a fifth position, a position 10 μm away from the fifth position in the lamination direction is denoted by a sixth position, a position of a principal surface on a side opposite to the first glass layer is denoted by a seventh position, a position 10 μm away from the seventh position in the lamination direction is denoted by an eighth position, a region between the fifth position and the sixth position is denoted by a second inner region, a region between the seventh position and the eighth position is denoted by a second outer region, and a region between the sixth position and the eighth position is denoted by a second intermediate region. Also, an area rate of pores in the second inner region is greater than an area rate of pores in the second intermediate region, and an average crystal particle size of ferrite in the second inner region is smaller than an average crystal particle size of ferrite in the second intermediate region.

<5> The coil component according to <4>, wherein, assuming the area rate of the pores in the second inner region to be 1, the area rate of the pores in the second intermediate region is 0.3 or more and 0.8 or less (i.e., from 0.3 to 0.8).

<6> The coil component according to <4> or <5>, wherein, assuming the average crystal particle size of the ferrite in the second inner region to be 1, the average crystal particle size of the ferrite in the second intermediate region is 1.5 or more and 2.5 or less (i.e., from 1.5 to 2.5).

<7> The coil component according to any one of <1> to <6>, wherein the first glass layer includes a filler containing at least one of quartz and alumina.

<8> The coil component according to any one of <1> to <7>, wherein the bare body further includes a second glass layer adjacent to the first ferrite layer on a side opposite to the first glass layer and a third glass layer adjacent to the second ferrite layer on a side opposite to the first glass layer.

<9> The coil component according to <8>, wherein an area rate of pores in the first outer region is greater than the area rate of the pores in the first intermediate region, and an average crystal particle size of ferrite in the first outer region is smaller than the average crystal particle size of the ferrite in the first intermediate region.

<10> The coil component according to <9>, wherein, assuming the area rate of the pores in the first outer region to be 1, the area rate of the pores in the first intermediate region is 0.3 or more and 0.8 or less (i.e., from 0.3 to 0.8).

<11> The coil component according to <9> or <10>, wherein, assuming the average crystal particle size of the ferrite in the first outer region to be 1, the average crystal particle size of the ferrite in the first intermediate region is 1.5 or more and 2.5 or less (i.e., from 1.5 to 2.5).

<12> The coil component according to any one of <8> to <11>, wherein, assuming that, in the second ferrite layer, a position of a principal surface on a side nearer to the first glass layer is denoted by a fifth position, a position 10 μm away from the fifth position in the lamination direction is denoted by a sixth position, a position of a principal surface on a side opposite to the first glass layer is denoted by a seventh position, a position 10 μm away from the seventh position in the lamination direction is denoted by an eighth position, a region between the fifth position and the sixth position is denoted by a second inner region, a region between the seventh position and the eighth position is denoted by a second outer region, and a region between the sixth position and the eighth position is denoted by a second intermediate region. Also, an area rate of pores in the second outer region is greater than an area rate of pores in the second intermediate region, and an average crystal particle size of ferrite in the second outer region is smaller than an average crystal particle size of ferrite in the second intermediate region.

<13> The coil component according to <12>, wherein, assuming the area rate of the pores in the second outer region to be 1, the area rate of the pores in the second intermediate region is 0.3 or more and 0.8 or less (i.e., from 0.3 to 0.8).

<14> The coil component according to <12> or <13>, wherein, assuming the average crystal particle size of the ferrite in the second outer region to be 1, the average crystal particle size of the ferrite in the second intermediate region is 1.5 or more and 2.5 or less (i.e., from 1.5 to 2.5).

<15> The coil component according to any one of <8> to <14>, wherein the second glass layer includes a filler containing at least one of quartz and alumina.

<16> The coil component according to any one of <8> to <15>, wherein the third glass layer includes a filler containing at least one of quartz and alumina.

<17> The coil component according to any one of <1> to <16>, wherein the coil component is a common mode choke coil including, as the coil, a first coil and a second coil insulated from the first coil.

What is claimed is:

1. A coil component comprising:

a bare body including a first glass layer, a first ferrite layer adjacent to a first principal surface side of the first glass layer, and a second ferrite layer adjacent to a second principal surface side of the first glass layer;

a coil inside the first glass layer; and outer electrodes on surfaces of the bare body and electrically connected to the coil, wherein assuming that, in the first ferrite layer, a position of a principal surface on a side nearer to the first glass layer is denoted by a first position, a position 10 μm away from the first position in a negative lamination direction is denoted by a second position, a position of a principal surface on a side opposite to the first glass layer is denoted by a third position, a position 10 μm away from the third position in a positive lamination direction is denoted by a fourth position, a region between the first position and the second position is denoted by a first inner region, a region between the third position and the fourth position is denoted by a first outer region, and a region between the second position and the fourth position is denoted by a first intermediate region, where the negative lamination direction is defined as a direction extending from the second principal surface side of the first glass layer to the first principal surface side of the first glass layer, and the positive lamination direction is defined as a direction extending from the first principal surface side of the first glass layer to the second principal surface side of the first glass layer, assuming an area ratio of pores in the first inner region to be 1, an area ratio of the pores in the first intermediate region is 0.3 to 0.8, and assuming an average crystal particle size of ferrite in the first inner region to be 1, an average crystal particle size of the ferrite in the first intermediate region is from 1.5 to 2.5.

2. The coil component according to claim 1, wherein assuming that, in the second ferrite layer, a position of a principal surface on a side nearer to the first glass layer is denoted by a fifth position, a position 10 μm away from the fifth position in the positive lamination direction is denoted by a sixth position, a position of a principal surface on a side opposite to the first glass layer is denoted by a seventh position, a position 10 μm away from the seventh position in the negative lamination direction is denoted by an eighth position, a region between the fifth position and the sixth position is denoted by a second inner region, a region between the seventh position and the eighth position is denoted by a second outer region, and a region between the sixth position and the eighth position is denoted by a second intermediate region, an area ratio of pores in the second inner region is greater than an area ratio of pores in the second intermediate region, and an average crystal particle size of ferrite in the second inner region is smaller than an average crystal particle size of ferrite in the second intermediate region.

3. The coil component according to claim 2, wherein assuming the area ratio of the pores in the second inner region to be 1, the area ratio of the pores in the second intermediate region is from 0.3 to 0.8.

4. The coil component according to claim 2, wherein assuming the average crystal particle size of the ferrite in the second inner region to be 1, the average crystal particle size of the ferrite in the second intermediate region is from 1.5 to 2.5.

5. The coil component according to claim 2, wherein the coil component is a common mode choke coil including, as the coil, a first coil and a second coil insulated from the first coil.

6. The coil component according to claim 1, wherein the first glass layer includes a filler containing at least one of quartz and alumina.

7. The coil component according to claim 1, wherein the bare body further includes a second glass layer adjacent to the first ferrite layer on a side opposite to the first glass layer and a third glass layer adjacent to the second ferrite layer on a side opposite to the first glass layer.

8. The coil component according to claim 7, wherein assuming that, in the second ferrite layer, a position of a principal surface on a side nearer to the first glass layer is denoted by a fifth position, a position 10 μm away from the fifth position in the positive lamination direction is denoted by a sixth position, a position of a principal surface on a side opposite to the first glass layer is denoted by a seventh position, a position 10 μm away from the seventh position in the negative lamination direction is denoted by an eighth position, a region between the fifth position and the sixth position is denoted by a second inner region, a region between the seventh position and the eighth position is denoted by a second outer region, and a region between the sixth position and the eighth position is denoted by a second intermediate region, an area ratio of pores in the second outer region is greater than an area ratio of pores in the second intermediate region, and an average crystal particle size of ferrite in the second outer region is smaller than an average crystal particle size of ferrite in the second intermediate region.

9. The coil component according to claim 8, wherein assuming the area ratio of the pores in the second outer region to be 1, the area ratio of the pores in the second intermediate region is from 0.3 to 0.8.

10. The coil component according to claim 8, wherein assuming the average crystal particle size of the ferrite in the second outer region to be 1, the average crystal particle size of the ferrite in the second intermediate region is from 1.5 to 2.5.

11. The coil component according to claim 7, wherein the second glass layer includes a filler containing at least one of quartz and alumina.

12. The coil component according to claim 7, wherein the third glass layer includes a filler containing at least one of quartz and alumina.

13. The coil component according to claim 1, wherein the coil component is a common mode choke coil including, as the coil, a first coil and a second coil insulated from the first coil.

14. A coil component comprising:

a bare body including a first glass layer, a first ferrite layer adjacent to one principal surface side of the first glass layer, and a second ferrite layer adjacent to an other principal surface side of the first glass layer;

a coil inside the first glass layer; and outer electrodes on surfaces of the bare body and electrically connected to the coil, wherein assuming that, in the first ferrite layer, a position of a principal surface on a side nearer to the first glass layer is denoted by a first position, a position 10 μm away from the first position in a negative lamination direction is denoted by a second position, a position of a principal surface on a side opposite to the first glass layer is denoted by a third position, a position 10 μm away from the third position in a positive lamination direction is denoted by a fourth position, a region between the first position and the second position is denoted by a first inner region, a region between the third position and the fourth position is denoted by a first outer region, and a region between the second position and the fourth position is denoted by a first intermediate region, where the negative lamination direction is defined as a direction extending from the second principal surface side of the first glass layer to the first principal surface side of the first glass layer, and the positive lamination direction is defined as a direction extending from the first principal surface side of the first glass layer to the second principal surface side of the first glass layer, an area ratio of pores in the first inner region is greater than an area ratio of pores in the first intermediate region, an average crystal particle size of ferrite in the first inner region is smaller than an average crystal particle size of ferrite in the first intermediate region, the bare body further includes a second glass layer adjacent to the first ferrite layer on a side opposite to the first glass layer and a third glass layer adjacent to the second ferrite layer on a side opposite to the first glass layer, an area ratio of pores in the first outer region is greater than the area ratio of the pores in the first intermediate region, and an average crystal particle size of ferrite in the first outer region is smaller than the average crystal particle size of the ferrite in the first intermediate region.

15. The coil component according to claim 14, wherein assuming the area ratio of the pores in the first outer region to be 1, the area ratio of the pores in the first intermediate region is from 0.3 to 0.8.

16. The coil component according to claim 14, wherein assuming the average crystal particle size of the ferrite in the first outer region to be 1, the average crystal particle size of the ferrite in the first intermediate region is from 1.5 to 2.5.

* * * * *